(12) United States Patent
Ohi

(10) Patent No.: US 8,078,393 B2
(45) Date of Patent: Dec. 13, 2011

(54) NAVIGATION APPARATUS

(75) Inventor: Makoto Ohi, Hyogo (JP)

(73) Assignee: Mitsubishi Electric Corporation, Tokyo (JP)

( * ) Notice: Subject to any disclaimer, the term of this patent is extended or adjusted under 35 U.S.C. 154(b) by 1267 days.

(21) Appl. No.: 11/664,959

(22) PCT Filed: Nov. 18, 2005

(86) PCT No.: PCT/JP2005/021290
§ 371 (c)(1),
(2), (4) Date: Apr. 9, 2007

(87) PCT Pub. No.: WO2006/087855
PCT Pub. Date: Aug. 24, 2006

(65) Prior Publication Data
US 2009/0012702 A1   Jan. 8, 2009

(30) Foreign Application Priority Data
Feb. 21, 2005 (JP) ................... 2005-044279

(51) Int. Cl.
*G06F 17/00* (2006.01)

(52) U.S. Cl. .................... 701/200; 340/995.12

(58) Field of Classification Search ............ 701/200, 701/207–213; 340/995.12, 995.24
See application file for complete search history.

(56) References Cited

U.S. PATENT DOCUMENTS

| | | | |
|---|---|---|---|
| 7,024,307 B2 * | 4/2006 | Ito et al. ............... | 701/208 |
| 7,499,800 B2 * | 3/2009 | Kimura ................ | 701/208 |
| 2002/0156739 A1 | 10/2002 | Hirai et al. | |
| 2003/0084313 A1 | 5/2003 | Tada | |
| 2005/0078581 A1 | 4/2005 | Hashimoto | |

FOREIGN PATENT DOCUMENTS

| | | |
|---|---|---|
| JP | 2002-358307 A | 12/2002 |
| JP | 2003-005630 A | 1/2003 |
| JP | 2003-131564 A | 5/2003 |
| JP | 2003-216504 A | 7/2003 |
| JP | 2004-117066 A | 4/2004 |

\* cited by examiner

*Primary Examiner* — Dalena Tran
(74) *Attorney, Agent, or Firm* — Birch, Stewart, Kolasch & Birch, LLP

(57) ABSTRACT

A navigation apparatus includes a map information updating means (13) for updating map information on a basis of map update information, a mounting detecting means (14) for detecting whether a storage medium is mounted to a storage medium driving means, a map information ID comparison means (15) for comparing a map information ID attached to the map information with a map information ID attached to the map update information to judge whether they match each other, a map information selection control means (16) for, when the storage medium is mounted to the storage medium driving means and the map information IDs match each other, selecting all of the map information, and selecting a part of the map information otherwise, a navigation information calculating means (17) for creating navigation information on the basis of the selected map information, and a navigation information output means (18) for outputting the created navigation information.

11 Claims, 15 Drawing Sheets

NAVIGATION APPARATUS

FIELD OF THE INVENTION

The present invention relates to a navigation apparatus which carries out various guidance processes using map information. More particularly, it relates to a technology for updating stored map information using map update information.

BACKGROUND OF THE INVENTION

Conventionally, a navigation apparatus which detects the current position of a vehicle equipped with the navigation apparatus using GPS (Global Positioning System), detects the traveling direction of the vehicle using a gyro sensor, reads map data about an area surrounding the current position of the vehicle from a storage medium so as to form a map, displays the map on a display screen, and displays the current position and traveling direction of the vehicle on this map is known.

As such a navigation apparatus, for example, a navigation apparatus which updates map data stored in a hard disk drive unit (referred to as "HDD (Hard Disk Drive)" from here on) using map update information stored in a DVD-ROM (DVD-Read Only Memory) mounted to a DVD (Digital Versatile Disk) drive is known. This navigation apparatus writes map data read from the DVD-ROM in the HDD first. After that, the navigation apparatus carries out various processes by reading the map data from the HDD at a high speed and by writing certain data in the HDD. Therefore, this prior art navigation apparatus can reduce the time required to carry out a display of a map and route searching as compared with a case in which map data are read directly from the DVD-ROM and are processed.

However, because the above-mentioned prior art navigation apparatus can freely write map data read from a DVD-ROM in an HDD, it can also allow map data stored in a single DVD-ROM to be copied illegally into a large number of HDDs. Therefore, a navigation apparatus which prevents the use of map data copied illegally has been developed (for example, refer to patent reference 1).

This navigation apparatus is provided with a first data recording unit for mounting a first storage medium (concretely, a DVD-ROM which stores map update information), a second data recording unit for mounting a second storage medium (concretely, an HDD which stores map data), a data decision processing means for judging whether or not data are included in the first storage medium, and a data selection processing means for, when data are included in the first storage medium, selecting one of data stored in the first storage medium and data stored in the second storage medium, and for, when no data are included in the first storage medium, stopping the selection of data. Because this navigation apparatus stops the selection of data when no data are included in the first storage medium, it can prevent the use of data copied illegally.

[Patent reference 1] JP, 2003-216504, A

Because the navigation apparatus disclosed by above-mentioned patent reference 1 stops reading of map data from the second storage medium when the first storage medium is not mounted and then inhibits the output of all information which the navigation apparatus can provide for the user, the navigation apparatus can prevent any illegal use of the map information.

A problem is, however, that when the first storage medium is not mounted and the navigation apparatus then inhibits the output of all the information which the navigation apparatus can provide for the user, the user cannot judge whether the cause of the stop of the output of all the information is a failure of the navigation apparatus or another factor, and therefore the prior art navigation apparatus is inferior in user-friendliness.

The present invention is made in order to solve the above-mentioned problem, and it is therefore an object of the present invention to provide a user-friendly navigation apparatus which can make the user guess that the suppression of information which can be provided for the user results from illegal use of the map data.

DISCLOSURE OF THE INVENTION

In accordance with a first aspect of the present invention, there is provided a navigation apparatus including: a map information storage means for storing map information; a storage medium driving means in which a storage medium for storing map update information used for updating the map information is mounted; a map information updating means for updating the map information stored in the map information storage means on a basis of the map update information read from the storage medium mounted to the storage medium driving means; a mounting detecting means for detecting whether or not the storage medium is mounted to the storage medium driving means; a map information ID comparison means for comparing a map information ID attached to the map information stored in the map information storage means with a map information ID attached to the map update information stored in the storage medium mounted to the storage medium driving means so as to judge whether they match each other; a map information selection control means for, when the mounting detecting means detects that the storage medium is mounted to the storage medium driving means and the map information ID comparison means judges that the map information IDs match each other, selecting all of the map information stored in the map information storage means, and selecting a part of the map information stored in the map information storage means otherwise; a navigation information calculating means for creating navigation information by carrying out an predetermined operation on a basis of the map information selected by the map information selection control means; and a navigation information output means for outputting the navigation information created by the navigation information calculating means, in order to solve the above-mentioned problem.

In accordance with a second aspect of the present invention, there is provided a navigation apparatus including: a map information storage means for storing map information; a storage medium driving means in which a storage medium for storing map update information used for updating the map information is mounted; a map information updating means for updating the map information stored in the map information storage means on a basis of the map update information read from the storage medium mounted to the storage medium driving means; a mounting detecting means for detecting whether the storage medium is mounted to the storage medium driving means; a map information ID comparison means for comparing a map information ID attached to the map information stored in the map information storage means with a map information ID attached to the map update information stored in the storage medium mounted to the storage medium driving means so as to judge whether they match each other; an operation item selection control means for, when the mounting detecting means detects that the storage medium is mounted to the storage medium driving means and the map information ID comparison means judges that the map information IDs match each other, selecting all operation items which implement all functions which the navigation apparatus has, and selecting some of all the operations items which implement some of all the functions otherwise; a navigation information calculating means for creating navigation information by carrying out operation items selected by the operation item selection control means; and a navigation information output means for outputting the navigation information created by the navigation information calculating means.

Even though the storage medium in which the map update information is stored is mounted to the storage medium driving means, the navigation apparatus in accordance with the first aspect of the present invention does not send all of the map information to the navigation information calculating means unless the map information ID attached to the map update information stored in the mounted storage medium matches the map information ID attached to the map information stored in the map information storage means. Therefore, the navigation information calculating means does not output a part of the navigation information which the navigation apparatus should output originally. For this reason, the user cannot enjoy convenience which he or she expects to get from the navigation apparatus. On the other hand, because only a part of the map information is sent to the navigation information calculating means, the navigation information calculating means outputs only a part of the navigation information which the navigation apparatus should output originally. Therefore, the user can recognize that the reason why the navigation information which should be outputted is missing results from an illegal update of the map data.

Even though the storage medium in which the map update information is stored is mounted to the storage medium driving means, the navigation apparatus in accordance with the second aspect of the present invention inhibits some operation items from being carried out unless the map information ID attached to the map update information stored in the mounted storage medium matches the map information ID attached to the map information stored in the map information storage means. Therefore, the navigation information calculating means does not output a part of the navigation information which the navigation apparatus should output originally. For this reason, the user cannot enjoy convenience which he or she expects to get from the navigation apparatus. On the other hand, because only some operation items are carried out, the navigation information calculating means outputs only a part of the navigation information which the navigation apparatus should output originally. Therefore, the user can recognize that the reason why the navigation information which should be outputted is missing results from an illegal update of the map data.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
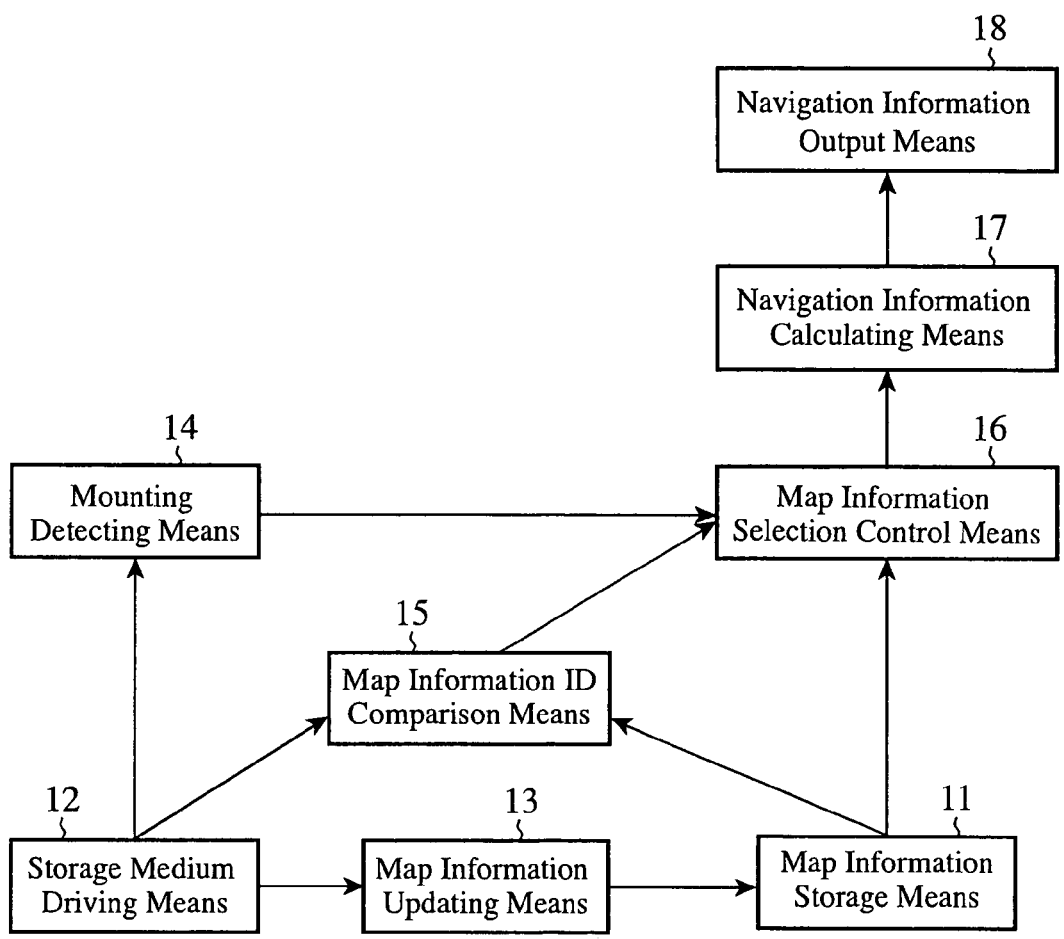
FIG. 1 is a block diagram showing the structure of a navigation apparatus according to embodiment 1 of the present invention.

FIG. 1 is a block diagram showing the structure of a navigation apparatus in accordance with the embodiment 1 of the present invention. This navigation apparatus is provided with a map information storage means 11, a storage medium driving means 12, a map information updating means 13, a mounting detecting means 14, a map information ID comparison means 15, a map information selection control means 16, a navigation information calculating means 17, and a navigation information output means 18.

The map information storage means 11 consists of, for example, an HDD, and stores map information containing map data. The map information stored in this map information storage means 11 is updated by the map information updating means 13. The map information stored in the map information storage means 11 is also referred to by the map information selection control means 16. The map information stored in the map information storage means 11 includes a map information ID attached to this map information. This map information ID included in the map information is sent to the map information ID comparison means 15. The map information storage means 11 can consist of a storage medium which allows relatively-high-speed access, such as a semiconductor memory, instead of the HDD.

The storage medium driving means 12 consists of, for example, a DVD drive, and can allow a DVD-ROM (simply referred to as "DVD" from here on) which is a storage medium for storing map update information used for updating the map information to be mounted or dismounted thereto or therefrom. This DVD is used in order to update the map data. Updated map data or difference data used for updating the map data can be stored in this DVD for update of the map data. The storage medium driving means 12 sends a signal indicating mounting or dismounting of the storage medium to or from the storage medium driving means to the mounting detecting means 14. The storage medium driving means 12 also sends the map information ID stored in the storage medium which is mounted to the storage medium driving means to the map information ID comparison means 15. Instead of the DVD drive, a drive device for driving one of various types of storage media which can be mounted or dismounted thereto or therefrom can be used as the storage medium driving means 12.

The map information updating means 13 updates the map information stored in the map information storage means 11 using the map update information stored in the storage medium which is mounted to the storage medium driving means 12. For example, the map information updating means reads the map information from the DVD for update of the map data which is the storage medium mounted to the storage medium driving means 12, and transfers the read map information to the HDD which is disposed as the map information storage means 11. Thereby, the map information stored in the HDD is updated (or upgraded).

The mounting detecting means 14 detects whether or not the storage medium is mounted to the storage medium driving means 12 on the basis of the signal indicating mounting or dismounting of the storage medium, which is sent from the storage medium driving means 12. For example, the mounting detecting means 14 detects whether or not the DVD for update of the map data is inserted into the DVD drive. The detection result of this mounting detecting means 14 is sent to the map information selection control means 16 as a mounting signal. To be more specific, when the storage medium is mounted to the storage medium driving means 12, "1" is sent to the map information selection control means 16 as the mounting signal, whereas when the storage medium is not mounted to the storage medium driving means 12, "0" is sent to the map information selection control means 16 as the mounting signal.

The map information ID comparison means 15 compares the map information ID stored in the storage medium mounted to the storage medium driving means 12 with the map information ID stored in the map information storage means 11. For example, version data indicating the version of the map data is used as the map information ID of the map data. Concretely, the map information ID comparison means 15 compares the version data stored in the DVD for update of the map data inserted into the DVD drive with the version data stored in the HDD. The comparison result by this map information ID comparison means 15 is sent to the map information selection control means 16 as a matching signal. To be more specific, when the version data stored in the DVD matches the version data stored in the HDD, "1" is sent to the map information selection control means 16 as the matching signal, whereas when the version data stored in the DVD does not match the version data stored in the HDD, "0" is sent to the map information selection control means 16 as the matching signal.

The map information selection control means 16 selects the map information read from the map information storage means 11 on the basis of both the mounting signal from the mounting detecting means 14, and the matching signal from the map information ID comparison means 15, and sends the map information to the navigation information calculating means 17. That is, when the storage medium is mounted to the storage medium driving means 12, and a condition that the map information ID stored in the map information storage means 11 matches the map information ID stored in the storage medium mounted to the storage medium driving means 12 is satisfied, the map information selection control means 16 judges that the storage medium is being used legally, and sends all the map information read from the map information storage means 11 to the navigation information calculating means 17. In contrast, when the above-mentioned condition is not satisfied, the map information selection control means 16 judges that the storage medium is not being used legally, and sends only a part of the map information read from the map information storage means 11 to the navigation information calculating means 17.

To be more specific, when the DVD for update of the map data is inserted into the DVD drive, and the version data stored in this DVD matches the version data stored in the HDD, the map information selection control means determines that the DVD for update of the map data is being used legally, and makes all the map information available. In contrast, when the DVD for update of the map data is not inserted into the DVD drive, or when while the DVD for update of the map data is inserted into the DVD drive, the version of the map data stored in the DVD is older than the version of the map data stored in the HDD, the map information selection control means recognizes that the DVD for update of the map data has been transferred to another person, for example, determines that the DVD for update of the map data is being used illegally, and makes only a part of the map information available.

The map information stored in the map information storage means 11 is comprised of two or more information items. A "road name", a "facility name", "coordinate information which associates each point on a map with position information acquired from a position detecting means", etc. are included in the two or more information items. When the above-mentioned condition is satisfied, the map information selection control means 16 sends all the information items read from the map information storage means 11 to the navigation information calculating means 17, whereas when the above-mentioned condition is not satisfied, the map information selection control means inhibits the coordinate information read from the map information storage means 11 from being sent to the navigation information calculating means 17, and sends only road names and facility names to the navigation information calculating means 17, for example.

Figure 2:
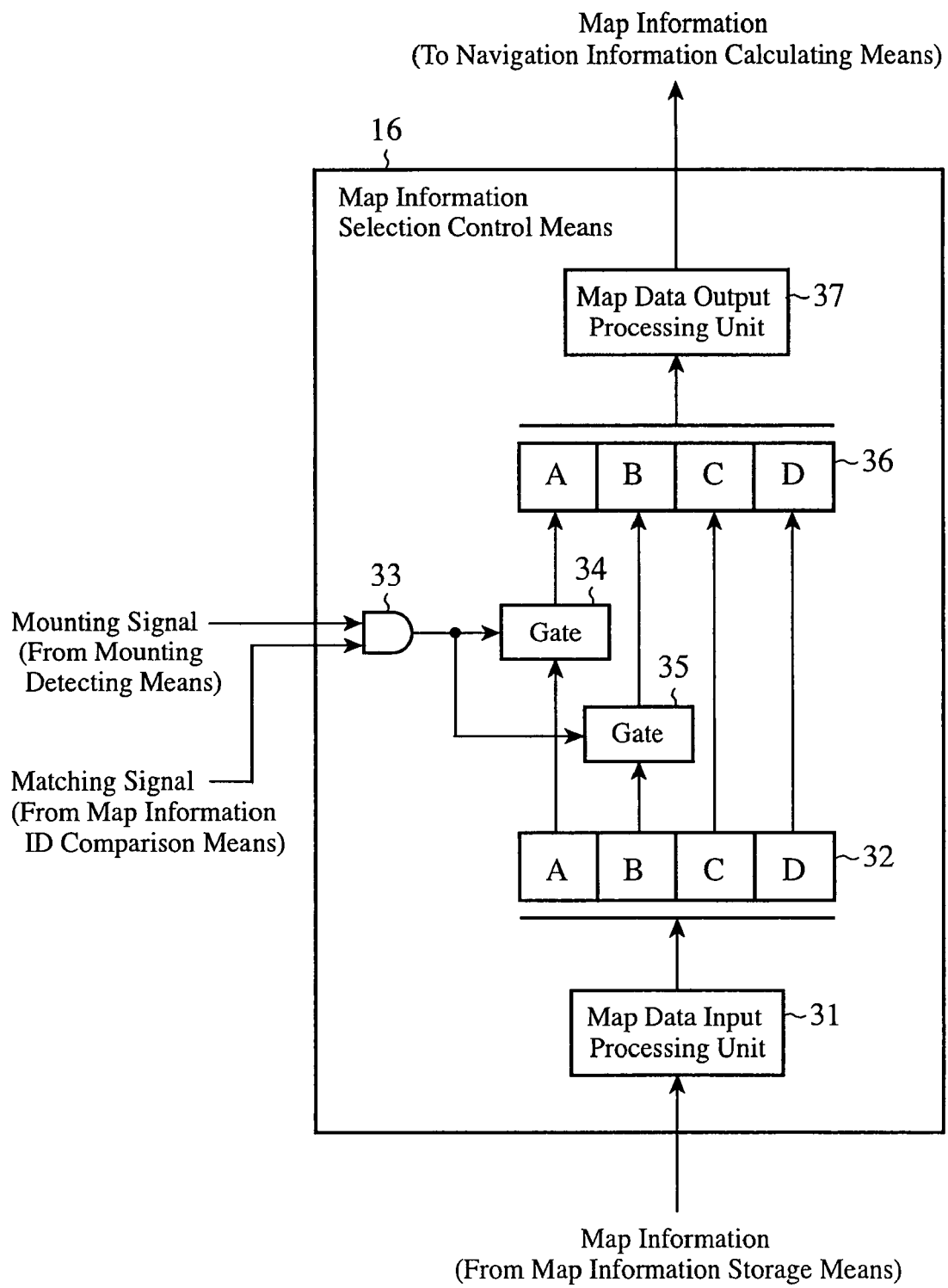
FIG. 2 is a block diagram showing the detailed structure of a map information selection control means shown in FIG. 1.

FIG. 2 is a block diagram showing the detailed structure of the map information selection control means 16.

This map information selection control means 16 is provided with a map data input processing unit 31, an input register 32, an AND gate 33, a gate 34, a gate 35, an output register 36, and a map data output processing unit 37. The map data input processing unit 31 divides the map information read from the map information storage means 11 into information items A to D, and sends them to the input register 32. The input register 32 stores the information items A to D into which the map information is divided by the map data input processing unit 31. The information item A stored in this input register 32 is sent to the gate 34, the information item B stored in the input register is sent to the gate 35, and the information items C and D stored in the input register are sent to the output register 36.

The AND gate 33 implements a logical AND operation on the mounting signal sent from the mounting detecting means 14, and the matching signal sent from the map information ID comparison means 15, and sends the AND operation result to the gates 34 and 35. Because the mounting signal indicates "1" and the matching signal indicates "1" when the above-mentioned condition is satisfied, the AND gate 33 outputs "1" to the gates 34 and 35.

When "1" is sent thereto from the AND gate 33, the gate 34 makes the information item A stored in the input register 32 pass therethrough to send it to the output register 36, whereas when "0" is sent thereto, it sends zero to the output register 36. Similarly, when "1" is sent thereto from the AND gate 33, the gate 35 makes the information item B stored in the input register 32 pass therethrough to send it to the output register 36, whereas when "0" is sent thereto, it sends zero to the output register 36. Therefore, when the above-mentioned condition is satisfied, all the information items A to D are sent to the output register 36, whereas when the condition is not satisfied, only the information items C and D are sent to the output register 36 and zero are set to portions of the output register 36 corresponding to the information items A and B.

The output register 36 stores the information item A sent from the gate 34 or zero, the information item B sent from the gate 35 or zero, and the information items C and D sent from the input register 32 therein, as mentioned above. The description stored in this output register 36 is sent to the map data output processing unit 37. The map data output processing unit 37 reads the information items from the output register 36, and sends them to the navigation information calculating means 17.

The map information selection control means 16 is so constructed as to selectively send only some of the information items of the map information read from the map information storage means 11 to the navigation information calculating means 17. As an alternative, the map information selection control means can be so constructed as to selectively send only map information about a limited geographical portion to the navigation information calculating means 17. For example, the map information selection control means can be so constructed as to send map information about A country to the navigation information calculating means 17, but as not to send map information about B country to the navigation information calculating means 17. As an alternative, the map information selection control means can be so constructed as to selectively send only a combination of some information items and map information about a limited geographical portion to the navigation information calculating means.

In the above-explained example, this process of selecting map information of the map information selection control means 16 is implemented via hardware. As an alternative, the selecting process can be implemented via software which runs on a processor. An example of the process implemented via software will be explained later with reference to FIG. 3.

The navigation information calculating means 17 carries out a predetermined operation on the basis of the map information sent from the map information selection control means 16 so as to create navigation information. Position information from the GPS, velocity information from the velocity sensor, azimuth information from the gyro sensor, destination setting information input through the user's manual operation, etc., as well as the map information, are included in the information inputted to the navigation apparatus. By carrying out a predetermined operation according to these pieces of information, the navigation information calculating means 17 creates navigation information for outputting a map, a route, the vehicle position, or driving guidance using the navigation information output means 18.

The navigation information output means 18 consists of, for example, a display device and a voice output device, and displays the map, route, vehicle position, etc. on the screen of the display device, and outputs the driving guidance with a sound from the voice output device on the basis of the navigation information sent from the navigation information calculating means 17.

Figure 3:
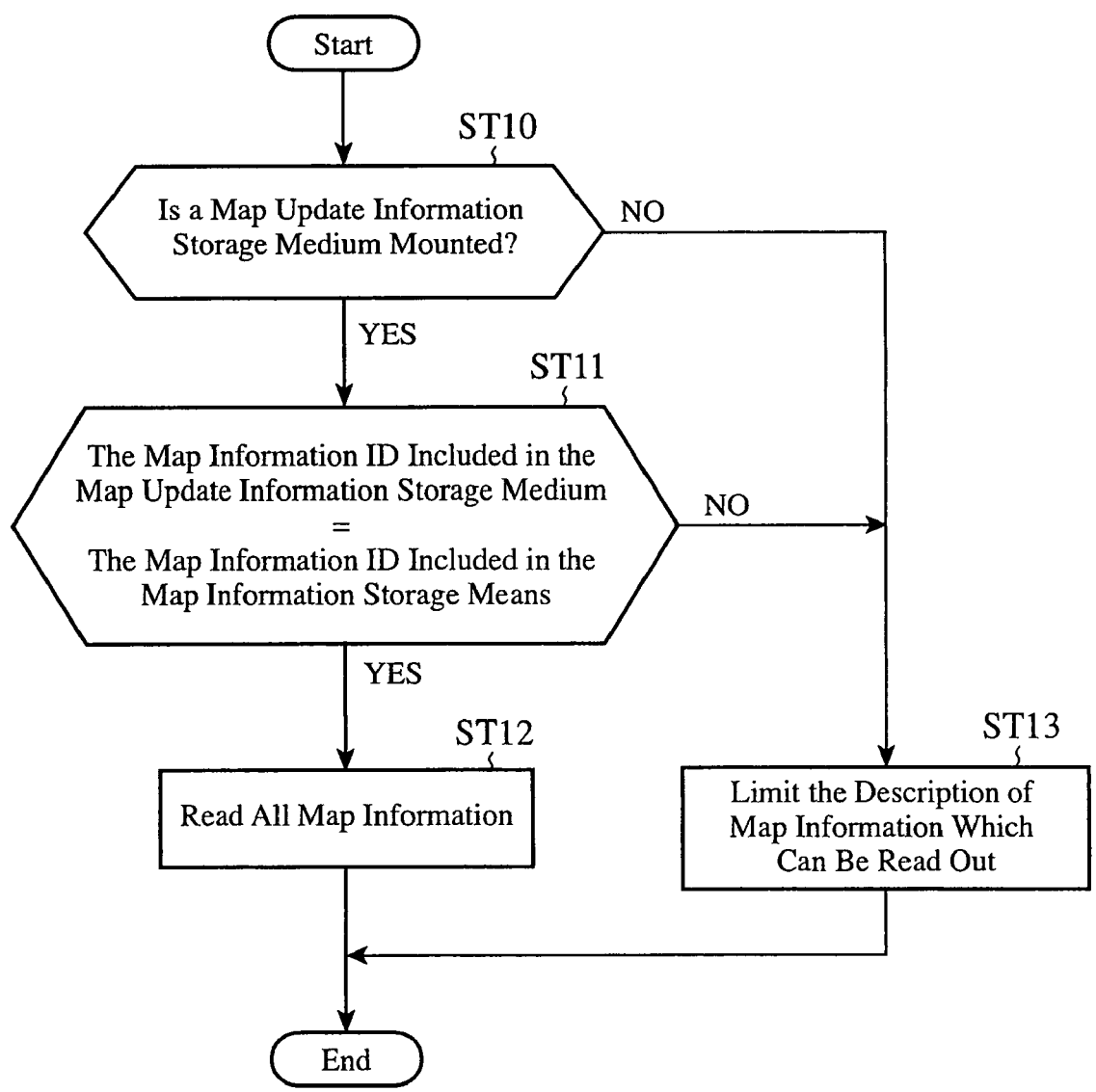
FIG. 3 is a flow chart showing an outline of a process of updating map information by the navigation apparatus in accordance with the embodiment 1 of the present invention.

Next, an outline of the process of updating the map information in the navigation apparatus in accordance with embodiment 1 of the present invention which is so constructed as mentioned above will be explained with reference to a flow chart shown in FIG. 3. This updating process is carried out by the map information selection control means 16.

When updating the map information, this navigation apparatus checks to see whether or not the storage medium in which the map update information is stored is mounted to the storage medium driving means 12 first (in step ST10). That is, the map information selection control means 16 checks to see whether the mounting signal sent from the mounting detecting means 14 indicates "1." When, in this step ST10, determining that the storage medium is mounted to the storage medium driving means, the map information selection control means then checks to see whether the map information ID included in the storage medium which stores the map update information matches the map information ID included in the map information storage means 11 (in step ST11). That is, the map information selection control means 16 checks to see whether the matching signal sent from the map information ID comparison means 15 indicates "1."

When, in this step ST11, determining that the storage medium which stores the map update information matches the map information ID included in the map information storage means, the map information selection control means reads all the map information (in step ST12). That is, the map information selection control means 16 sends all the information items that construct the map information read from the map information storage means 11 to the navigation information calculating means 17. In contrast, when, in above-mentioned step ST10, determining that no storage medium is mounted to the storage medium driving means, or when, in step ST11, determining that the storage medium which stores the map update information does not match the map information ID included in the map information storage means, the map information selection control means limits the description of map information which can be read out of the map information storage means (in step ST13). That is, the map information selection control means 16 sends only the information items C and D among all the information items which construct the map information read from the map information storage means 11 to the navigation information calculating means 17.

As previously explained, even though a storage medium in which map update information is stored is mounted to the storage medium driving means 12, the navigation apparatus in accordance with the embodiment 1 of the present invention limits the information items of the map information which are used for creation of the navigation information unless the map information ID included in the map update information stored in the mounted storage medium matches the map information ID included in the map information stored in the map information storage means 11. As a result, the navigation information calculating means 17 outputs only predetermined information included in the navigation information which the navigation apparatus should output originally. For this reason, the user cannot enjoy convenience which he or she expects to get from the navigation apparatus.

Therefore, in order for the user to be able to enjoy convenience which the navigation apparatus originally offers, the user needs to mount the storage medium in which the map information ID which matches the map information ID stored in the map information storage means 11 is stored in the storage medium driving means 12. As a result, the navigation apparatus can prevent any illegal use (update) of the map information. Concretely, because the navigation apparatus judges that the map data are being used legally only when the DVD for update of the map data is always inserted into the DVD drive, and the version of the map data stored in the DVD matches the version of the map data stored in the HDD, the navigation apparatus can prevent any illegal use (update) of the map data.

A case in which the user updates the map data stored in the HDDs of two or more navigation apparatus using one DVD for update of the map data which he or she acquired by paying a usage fee is an illegal use (update) of the map data. In this case, since only one DVD for update of the map data is provided, all of the two or more navigation apparatus except for one navigation apparatus in which the map data has been updated using the DVD are placed in a state in which no DVD for update of the map data is inserted. That is, because navigation apparatus in which the DVD for update of the map data having a version which matches the version of the updated map data stored in the HDD is mounted are restricted to one navigation apparatus. Therefore, in any of the other navigation apparatus, there causes a case in which the version of the map data stored in an inserted DVD for update of the map data is older than the version of the map data stored in the HDD, such as a case in which an old-version DVD for update of the map data is inserted.

When detecting such a case, the navigation apparatus considers that it is placed in a state in which the DVD for update of the map data is being used illegally, and limits the description of map data which can be read out. Assuming a case in which coordinate information of the map data cannot be used as an example in which the description of map data which can be read out is limited, the navigation apparatus cannot display the vehicle position on the screen because it cannot judge whether it should display the vehicle position on which part of the map. Unless the vehicle position is displayed, the navigation apparatus cannot offer convenience which the user expects. Therefore, when the DVD for update of the map data is used illegally, the navigation apparatus can protect the DVD for update of the map data from unauthorized use by imposing such a penalty on the illegal use of the DVD.

In the navigation apparatus in accordance with this embodiment 1, the limitation of the use of information items of the map information used for creation of the navigation information results in that the navigation information calculating means 17 outputs only predetermined information among the navigation information which the navigation apparatus should output originally. In this case, because the use of all of the information items is not inhibited, some pieces of navigation information are outputted as usual. Therefore, when the storage medium in which the map update information is stored is not mounted, or when the map information ID stored in the storage medium does not match the map information ID stored in the map information storage means 11 even if the storage medium is mounted, because the navigation apparatus provides some pieces of navigation information for the user as usual, the user can recognize that the reason why information which should be outputted is missing results from an illegal update of the map data.

To be more specific, assuming a case in which coordinate information of the map data cannot be used as an example of the limitation of the use of the map information, the navigation apparatus cannot display the vehicle position on the screen, as mentioned above. On the other hand, because the coordinate information of the map data is referred to in order to associate the received description of GPS signals with a location on the map, the navigation apparatus can display only a map on the screen even in a case of not referring to the coordinate information. Therefore, when the DVD for update of the map data is not inserted or when an old-version DVD for update of the map data is inserted, the navigation apparatus can output a part of the information which the navigation apparatus can provide originally, though it does not offer convenience which the navigation apparatus can provide originally.

Embodiment 2

Figure 4:
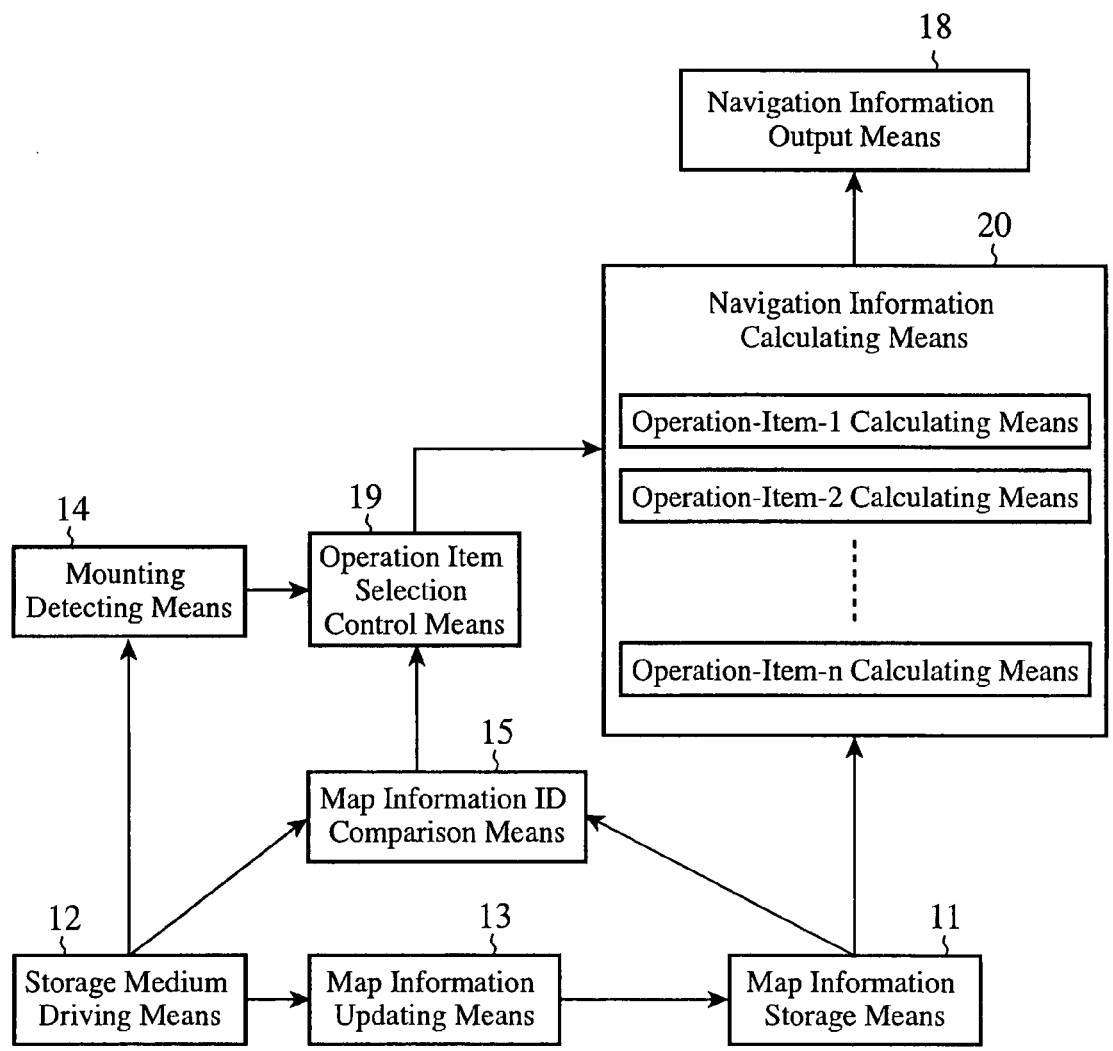
FIG. 4 is a block diagram showing the structure of a navigation apparatus according to embodiment 2 of the present invention.

FIG. 4 is a block diagram showing the structure of a navigation apparatus in accordance with the embodiment 2 of the present invention. This navigation apparatus is provided with a map information storage means 11, a storage medium driving means 12, a map information updating means 13, a mounting detecting means 14, a map information ID comparison means 15, an operation item selection control means 19, a navigation information calculating means 20, and a navigation information output means 18.

In the navigation apparatus in accordance with this embodiment 2, the operation item selection control means 19 is disposed instead of the map information selection control means 16 of embodiment 1, and the navigation information calculating means 20 is disposed instead of the navigation information calculating means 17. Hereinafter, the navigation apparatus of this embodiment will be explained focusing on the components which are different from those of the navigation apparatus in accordance with embodiment 1.

The operation item selection control means 19 determines operation items to be executed on the basis of a mounting signal from the mounting detecting means 14, and a matching signal from the map information ID comparison means 15. That is, when a storage medium is mounted to the storage medium driving means 12, and a condition that a map information ID included in map information stored in the map information storage means 11 matches a map information ID included in map update information stored in the storage medium mounted to the storage medium driving means 12 is satisfied, the operation item selection control means 19 judges that the storage medium is being used legally, and instructs the navigation information calculating means 20 to execute all operation items for implementing all functions which the navigation apparatus has. In contrast, when the above-mentioned condition is not satisfied, the operation item selection control means 19 judges that the storage medium is not being used legally, and instructs the navigation information calculating means 20 to carry out some of all the operation items for implementing a part of all the functions which the navigation apparatus has.

The navigation information calculating means 20 is provided with an operation-item-1 calculating means, an operation-item-2 calculating means, . . . , and an operation-item-n calculating means for carrying out n operation items (n is a positive integer) including an operation item 1, an operation item 2, ..., and an operation item n, respectively. For example, the following operations can be assigned to the operation items, respectively.

A map drawing operation: the operation item 1
A vehicle position calculating operation: the operation item 2
A route searching operation: the operation item 3
A guidance information operation: the operation item 4
An address/position specification operation: the operation item 5
A facility information reference operation: the operation item 6

The navigation information calculating means 20 executes operation items according to an instruction from the operation item selection control means 19. The results of the execution of this navigation information calculating means 20 are sent to the navigation information output means 18 as navigation information. In this case, only navigation information corresponding to the operation items which are carried out is sent to the navigation information output means 18, and no navigation information corresponding to remaining operation items which are not carried out is sent to the navigation information output means 18.

Figure 5:
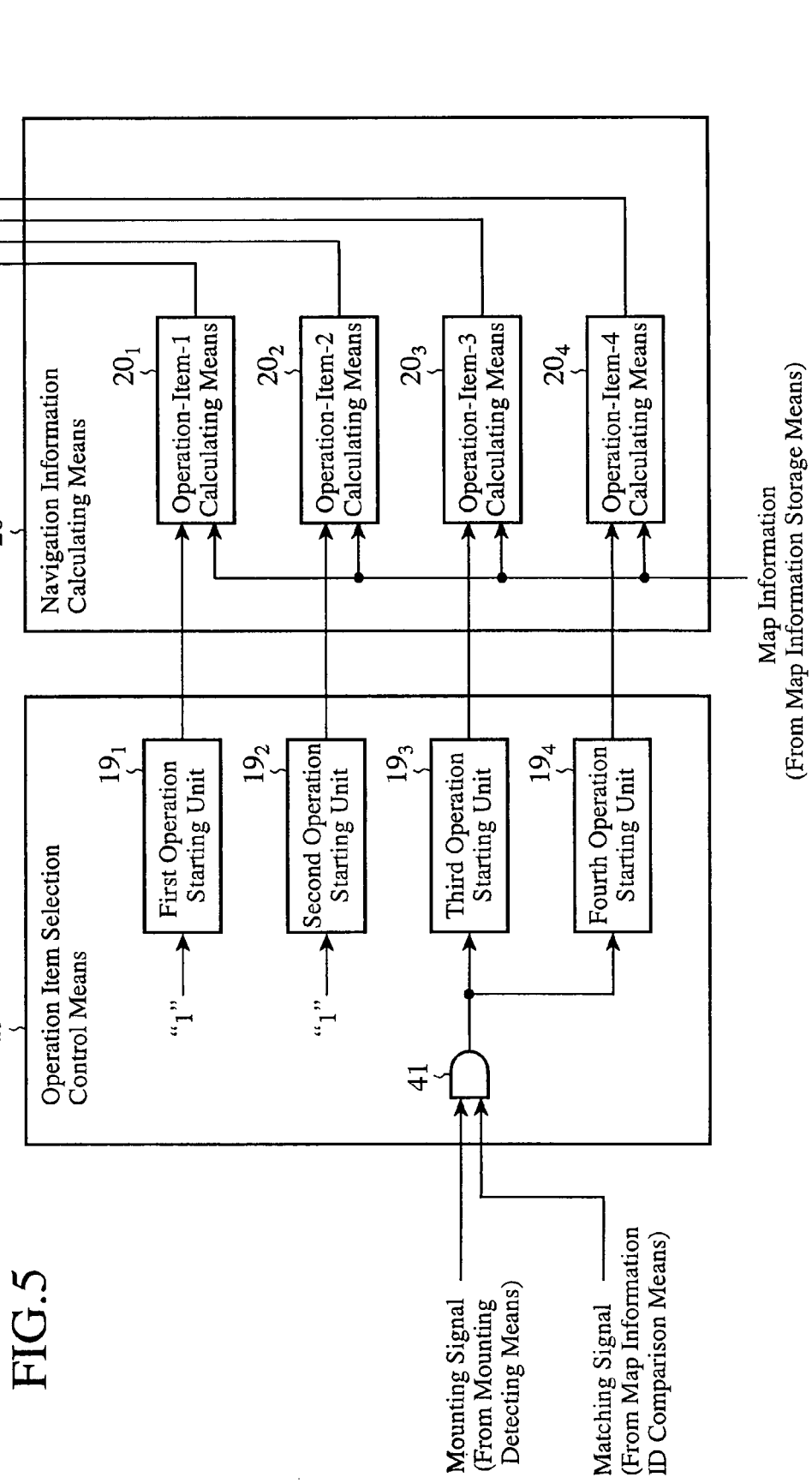
FIG. 5 is a block diagram showing the detailed structures of an operation item selection control means and a navigation information calculating means shown in FIG. 4.

FIG. 5 is a block diagram showing the detailed structure of the operation item selection control means 19 and navigation information calculating means 20. For the sake of simplicity, a case of executing four operation items is shown in FIG. 5.

The operation item selection control means 19 is provided with an AND gate 41 and first to fourth operation starting units $19_1$ to $19_4$. Because "1" is always inputted to the first operation starting unit $19_1$, the first operation starting unit $19_1$, always creates a start signal and sends it to the navigation information calculating means 20. Because "1" is always inputted to the second operation starting unit $19_2$, the second operation starting unit $19_2$ always creates a start signal and sends it to the navigation information calculating means 20. The third operation starting unit $19_3$ creates a start signal and sends it to the navigation information calculating means 20 when "1" is inputted thereto from the AND gate 41, whereas it does not create the start signal when "0" is inputted thereto from the AND gate 41. The fourth operation starting unit creates a start signal and sends it to the navigation information calculating means 20 when "1" is inputted thereto from the AND gate 41, whereas it does not create the start signal when "0" is inputted thereto from the AND gate 41.

The AND gate 41 implements a logical AND operation on the mounting signal sent from the mounting detecting means 14, and the matching signal sent from the map information ID comparison means 15, and sends the logical AND operation result to both the third operation starting unit $19_3$ and the fourth operation starting unit $19_4$. Now, assuming that the mounting signal indicates "1" and the matching signal also indicates "1", because the storage medium is mounted to the storage medium driving means 12, and the condition that the map information ID stored in the map information storage means 11 matches the map information ID stored in the storage medium mounted to the storage medium driving means 12 is satisfied, the AND gate 41 sends "1" to both the third operation starting unit $19_3$ and the fourth operation starting unit $19_4$.

The process of selecting operation items of this operation item selection control means 19 is implemented via hardware, as previously explained. As an alternative, the selecting process can be implemented via software which runs on a processor. An example of the process implemented via software will be explained later with reference to FIG. 6.

The navigation information calculating means 20 is provided with an operation-item-1 calculating means $20_1$, an operation-item-2 calculating means $20_2$, an operation-item-3 calculating means $20_3$, and an operation-item-4 calculating means $20_4$. When receiving start signals from the first operation starting unit $19_1$ to the fourth operation starting unit $19_4$ of the operation item selection control means 19, respectively, the operation-item-1 calculating means $20_1$ to the operation-item-4 calculating means $20_4$ acquire map information from the map information storage means 11, execute operations, respectively, and send the results of the execution of the operations to the navigation information output means 18 as navigation information.

Figure 6:
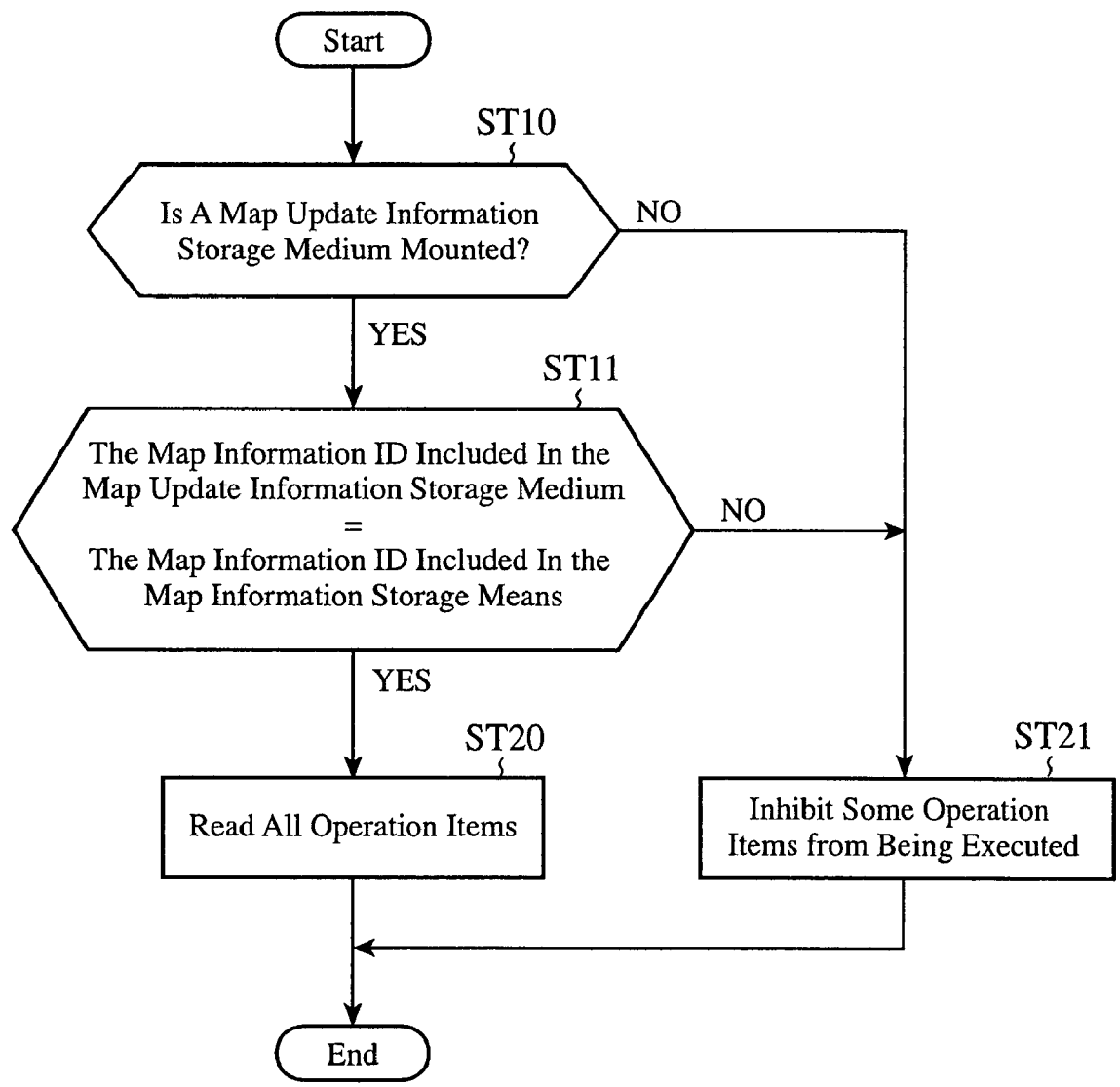
FIG. 6 is a flow chart showing an outline of a process of updating map information by the navigation apparatus in accordance with the embodiment 2 of the present invention.

Next, an outline of the updating process of updating the map information in the navigation apparatus in accordance with embodiment 2 of the present invention which is constructed as mentioned above will be explained with reference to the flow chart shown in FIG. 6. This updating process is carried out by the operation item selection control means 19. The steps in which the same processes as those of the flow chart shown in FIG. 3 are carried out are designated by the same reference symbols as shown in FIG. 3.

When updating the map information, this navigation apparatus checks to see whether or not the storage medium in which the map update information is stored is mounted to the storage medium driving means 12 first (in step ST10). That is, the operation item selection control means 19 checks to see whether the mounting signal sent from the mounting detecting means 14 indicates "1." When, in this step ST10, determining that the storage medium in which the map update information is stored is mounted to the storage medium driving means, the operation item selection control means then checks to see whether the map information ID included in the storage medium which stores the map update information matches the map information ID included in the map information storage means 11 (in step ST11). That is, the operation item selection control means 19 checks to see whether the matching signal sent from the map information ID comparison means 15 indicates "1."

When, in this step ST11, determining that the map information ID included in the storage medium matches the map information ID included in the map information storage means, the operation item selection control means executes all the operation items (in step ST20). That is, the operation item selection control means 19 instructs the navigation information calculating means 20 to execute all the operation items A to D. In contrast, when, in above-mentioned step ST10, determining that the storage medium in which the map update information is stored is not mounted to the storage medium driving means, or when, in step ST11, determining that the map information ID included in the storage medium does not match the map information ID included in the map information storage means, the operation item selection control means inhibits some operation items from being carried out (in step ST21). That is, the operation item selection control means 19 instructs the navigation information calculating means 20 to carry out some operation items C and D.

As previously explained, even if a storage medium in which map update information is stored is mounted to the storage medium driving means 12, the navigation apparatus in accordance with the embodiment 2 of the present invention inhibits some operation items from being carried out thereby unless the map information ID stored in the mounted storage medium matches the map information ID stored in the map information storage means 11. As a result, the navigation information calculating means 20 outputs only predetermined information included in the navigation information which the navigation apparatus should output originally. For this reason, the user cannot enjoy convenience which he or she expects to get from the navigation apparatus.

Therefore, in order for the user to be able to enjoy convenience, which the navigation apparatus originally offers, without limitation, the user needs to mount a storage medium in which map information ID which matches the map information ID stored in the map information storage means 11 is stored in the storage medium driving means 12. As a result, the navigation apparatus can prevent any illegal use (update) of the map information.

In the navigation apparatus in accordance with this embodiment 2, the navigation information calculating means 20 outputs only a part of the navigation information which the navigation apparatus should output originally because the operation item selection control means 19 inhibits some operation items from being carried out. In this case, because the execution of all the operation items is not inhibited, some pieces of navigation information can be outputted as usual. Therefore, when no storage medium in which the map update information is stored is mounted to the storage medium driving means, or when even if a storage medium is mounted to the storage medium driving means, the map information ID stored in the storage medium does not match the map information ID stored in the map information storage means 11, because the navigation apparatus provides some pieces of navigation information for the user as usual, the user can recognize that the reason why information which should be outputted is missing results from an illegal update of the map data.

For example, assume that "vehicle position calculating operation" and "guidance information operation" are inhibited operation items. In this case, because no information on "vehicle position calculating operation" and "guidance information operation" is outputted from the navigation apparatus, the user cannot enjoy convenience which he or she expects from the navigation apparatus. In contrast, even if these operations are inhibited from being carried out, the other operation items are carried out and the results of the execution of the operation items are outputted. For example, a display of a map on the screen and a display of facility information can be carried out. That is, the navigation apparatus provides some pieces of information for the user as usual.

The navigation apparatus according to any one of above-mentioned embodiments 1 and 2 can be so constructed as to, when it is determined that the map data is updated illegally, that is, when no DVD for update of the map data as a storage medium for storing the map update information is inserted or when an old-version DVD for update of the map data is inserted, enable a display of a map and facility information (e.g., the types of facilities and a detailed explanation of the facilities) on the screen, and inhibit the function of displaying the vehicle position on the map and the function of computing a route from the vehicle position to the destination from being executed. Although this structure makes it possible to display a map and facility information, it cannot provide any convenience for the driver as the navigation apparatus because it cannot guide the driver to the destination.

Hereafter, assume that old map data (map information) are stored in the navigation apparatus. Geographical conditions shown by the map data, and the presence or absence of facilities, such as commercial facilities and public facilities, each of which can be set to the navigation apparatus as the destination vary year by year along with construction of new roads, establishment of new facilities, etc. In this case, assuming that old-version map data are stored in the navigation apparatus, there causes a deviation between actual geographical conditions and the physical appearances of facilities, and information provided by the navigation apparatus, so that the user finds it remarkably inconvenient. The user can easily understand that this inconvenience results from a deviation between actual geographical conditions and the physical appearances of facilities, and geographical conditions and facility information included in the map data.

Now, assume a case in which the user of the navigation apparatus borrows a new DVD for update of the map data from someone else, updates the map data stored in the HDD disposed as the map information storage means 11 of the navigation apparatus using this DVD, and, after that, returns the new DVD for update of the map data to the someone else. In this case, because the user of the navigation apparatus cannot insert the new DVD for update of the map data into the navigation apparatus after returning the new DVD to the someone else, the navigation apparatus determines that "the map data has been updated illegally" and operates in the above-mentioned way.

In this situation, the navigation apparatus does not carry out any guidance of the driver to the destination, though map information and facility information which it displays on the screen is the one which has been updated using the new DVD for update of the map data. Therefore, the user of the navigation apparatus can recognize that if the user pays a regular use fee to purchase the new DVD for update of the map data, the inconvenience that the user has felt previously can be eliminated, that is, the deviation between the actual geographical conditions and physical appearances of facilities, and geographical conditions and facility information included in the map data will be canceled before he or she purchases the new DVD for update of the map data. That is, this navigation apparatus makes it possible for the user to correctly and easily know how the convenience of the navigation apparatus is improved after purchasing the DVD for update of the map data.

Embodiment 3

Figure 7:
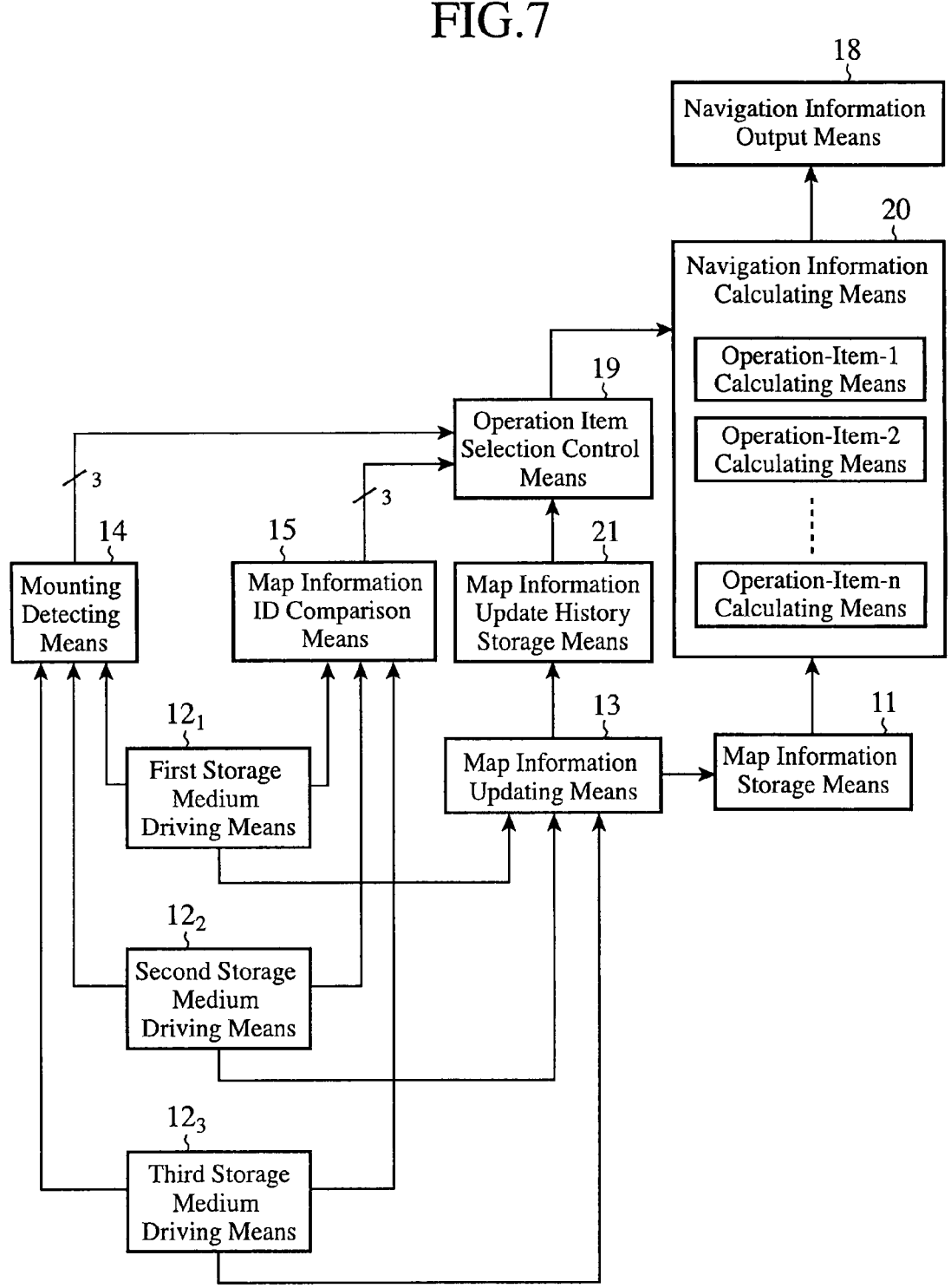
FIG. 7 is a block diagram showing the structure of a navigation apparatus according to embodiment 3 of the present invention.

FIG. 7 is a block diagram showing the structure of a navigation apparatus in accordance with embodiment 3 of the present invention. This navigation apparatus is provided with a map information storage means 11, a first storage medium driving means 12$_1$, a second storage medium driving means 12$_2$, a third storage medium driving means 12$_3$, a map information updating means 13, a mounting detecting means 14, a map information ID comparison means 15, an operation item selection control means 19, a navigation information calculating means 20, and a navigation information output means 18.

The navigation apparatus in accordance with this embodiment 3 is so constructed as to include the three storage medium driving means, i.e., the first storage medium driving means 12$_1$, second storage medium driving means 12$_2$, and third storage medium driving means 12$_3$, instead of the storage medium driving means 12 of embodiment 2. The navigation apparatus additionally includes a map information update history storage means 21. In this embodiment 3, for the sake of simplicity, the number of storage medium driving means is "3", though in accordance with the present invention, the number of storage medium driving means is arbitrary. The structures and operations of the map information updating means 13, mounting detecting means 14, map information ID comparison means 15, and operation item selection control means 19 differ from those of embodiment 2. Hereinafter, the navigation apparatus of this embodiment will be explained focusing on the components which are different from those of the navigation apparatus in accordance with the embodiment 2.

The map information updating means 13 updates map information stored in the map information storage means 11 using map update information stored in storage media respectively mounted to the first to third storage medium driving means $12_1$ to $12_3$. After updating the map information stored in the map information storage means 11, the map information updating means sends the map information ID of the updated map information to the map information update history storage means 21.

The map information update history storage means 21 has three map information ID storage areas 1 to 3, and stores three map information IDs which have been acquired by the map information updating means 13 during the newest three updates of the map information among previous updates of the map information which were carried out in the past in the three map information ID storage areas, respectively. Concretely, the map information IDs are stored in the three map information ID storage areas 1 to 3, respectively, as follows.

First, in this navigation apparatus, nothing is stored in the map information update history storage means 21 in a state in which any update of the map information is not carried out once (a state in which no map information ID is stored will be shown by "None" hereafter).

Map information ID storage area 1->None
Map information ID storage area 2->None
Map information ID storage area 3->None Next, assuming that the map information stored in the map information storage means 11 is updated to map information of an map information ID=ID1, the description of the map information update history storage means 21 is updated as follows.

Map information ID storage area 1->ID1
Map information ID storage area 2->None
Map information ID storage area 3->None After that, assuming that the map information stored in the map information storage means 11 is updated to map information of map information ID=ID2, the description of the map information update history storage means 21 is updated as follows.

Map information ID storage area 1->ID2
Map information ID storage area 2->ID1
Map information ID storage area 3->None Similarly, assuming that the map information stored in the map information storage means 11 is updated in turn to several pieces of map information of map information ID= ID3->ID4->ID5, the description of the map information update history storage means 21 is updated as follows. In this case, because the number of map information ID storage areas is three and the number of times that an update has been carried out is 5, the two oldest map information IDs are abandoned.

Map information ID storage area 1->ID5
Map information ID storage area 2->ID4
Map information ID storage area 3->ID3

The mounting detecting means 14 detects whether or not storage media are mounted to the first to third storage medium driving means $12_1$ to $12_3$, respectively, on the basis of signals indicating whether or not storage media are mounted, which are sent from the first to third storage medium driving means $12_1$ to $12_3$, respectively. The detection results of this mounting detecting means 14 are then sent to the operation item selection control means 19 as mounting signals. The map information ID comparison means 15 detects the map information IDs stored in the storage media mounted to the first to third storage medium driving means $12_1$ to $12_3$, respectively.

The map information IDs detected by this map information ID comparison means 15 are then sent to the operation item selection control means 19.

The operation item selection control means 19 determines operation items which are to be carried out on the basis of the mounting signals sent from the mounting detecting means 14, the matching signals sent from the map information ID comparison means 15, and the map information update history (i.e., the map information IDs) sent from the map information update history storage means 21.

Figure 8:
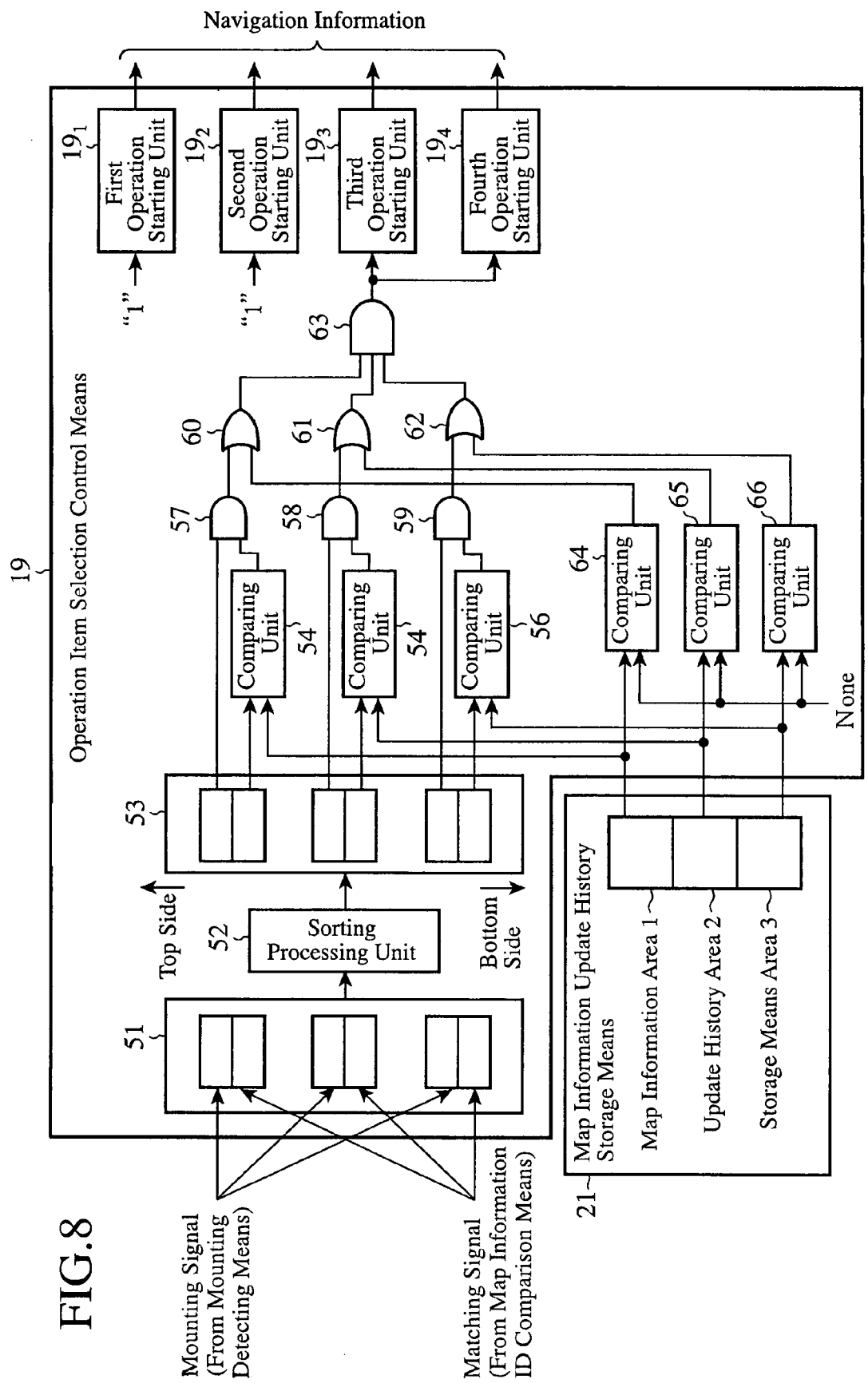
FIG. 8 is a block diagram showing the detailed structure of an operation item selection control means shown in FIG. 7.

FIG. 8 is a block diagram showing the detailed structure of the operation item selection control means 19. This operation item selection control means 19 is provided with an input register 51, a sorting processing unit 52, a sorting register 53, comparing units 54 to 56, two-input AND gates 57 to 59, OR gates 60 to 62, a three-input AND gate 64, comparing units 64 to 66, and first to fourth operation starting units $19_1$ to $19_4$.

The input register 51 stores three sets of data, i.e., data which pairs the mounting signal from the first storage medium driving means $12_1$ with the map information ID stored in the storage medium mounted to the first storage medium driving means $12_1$, data which pairs the mounting signal from the second storage medium driving means $12_2$ with the map information ID stored in the storage medium mounted to the second storage medium driving means $12_2$, and data which pairs the mounting signal from the third storage medium driving means $12_3$ with the map information ID stored in the storage medium mounted to the third storage medium driving means $12_1$. The description of this input register 51 is sent to the sorting processing unit 52.

The sorting processing unit 52 sorts the three sets of data sent from the input register 51 according to the following rule. First, the sorting processing unit classifies each data corresponding to a pair which has "1" as the mounting signal into a top-side group, and also classifies each data corresponding to a pair which has "0" as the mounting signal into a bottom-side group. The sorting processing unit then sorts data included in each of the top-side and bottom-side groups so that data having the largest map information ID (i.e., the newest map information ID) is placed at the most top end. The data thus sorted by this sorting processing unit 52 are then sent to the sorting register 53.

The sorting register 53 holds the data sent from the sorting processing unit 52. The mounting signal which is included in the top pair among the data held by this sorting register 53 is sent to the AND gate 57, and the map information ID included in the top pair is sent to the comparing unit 54. Similarly, the mounting signal included in the middle pair is sent to the AND gate 58, and the map information ID included in the middle pair is sent to the comparing unit 55. Similarly, the mounting signal included in the bottom pair is sent to the AND gate 59, and the map information ID included in the bottom pair is sent to the comparing unit 56.

The comparing unit 54 compares the map information ID included in the top pair sent from the sorting register 53 with the map information ID stored in the map information ID storage area 1 of the map information update history storage means 21, and outputs and sends "1" to the AND gate 57 when they match each other, whereas when they don't match each other, outputs and sends "0" to the AND gate 57. Similarly, the comparing unit 55 compares the map information ID included in the middle pair sent from the sorting register 53 with the map information ID stored in the map information ID storage area 2 of the map information update history storage means 21, and outputs and sends "1" to the AND gate 58 when they match each other, whereas when they don't match each other, outputs and sends "0" to the AND gate 58. Similarly, the comparing unit 56 compares the map information ID included in the bottom pair sent from the sorting register 53 with the map information ID stored in the map information ID storage area 3 of the map information update history storage means 21, and outputs and sends "1" to the AND gate 59 when they match each other, whereas when they don't match each other, outputs and sends "0" to the AND gate 59.

The AND gate 57 implements a logical AND operation on the mounting signal which is included in the top pair sent from the sorting register 53 and the output of the comparing unit 54, and sends the logical AND operation result to the OR gate 60. Therefore, when the storage medium used at the time of the newest update of the map information is mounted to any one of the first to third storage medium driving means $12_1$ to $12_3$ and the map information ID stored in the storage medium is stored in the map information ID storage area 1 of the map information update history storage means 21, the AND gate 57 outputs "1", and otherwise the AND gate outputs "0."

Similarly, the AND gate 58 implements a logical AND operation on the mounting signal which is included in the middle pair sent from the sorting register 53 and the output of the comparing unit 55, and sends the logical AND operation result to the OR gate 61. Therefore, when the storage medium used at the time of the second newest update of the map information is mounted to any one of the first to third storage medium driving means $12_1$ to $12_3$ and the map information ID stored in the storage medium is stored in the map information ID storage area 2 of the map information update history storage means 21, the AND gate 58 outputs "1", and otherwise the AND gate outputs "0."

Similarly, the AND gate 59 implements a logical AND operation on the mounting signal which is included in the bottom pair sent from the sorting register 53 and the output of the comparing unit 56, and sends the logical AND operation result to the OR gate 62. Therefore, when the storage medium used at the time of the third newest (i.e., the oldest) update of the map information is mounted to any one of the first to third storage medium driving means $12_1$ to $12_3$ and the map information ID stored in the storage medium is stored in the map information ID storage area 3 of the map information update history storage means 21, the AND gate 59 outputs "1", and otherwise the AND gate outputs "0."

The comparing unit 64 compares the map information ID stored in the map information ID storage area 1 of the map information update history storage means 21 with the data None in a case in which nothing is stored in the map information ID storage area, and, when they do not match each other, the comparing unit sends "1" to the OR gate 60 and otherwise the comparing unit sends "0" to the OR gate 60. The comparing unit 65 compares the map information ID stored in the map information ID storage area 2 of the map information update history storage means 21 with the data None, and, when they do not match each other, the comparing unit sends "1" to the OR gate 61 and otherwise the comparing unit sends "0" to the OR gate 61. The comparing unit 66 compares the map information ID stored in the map information ID storage area 3 of the map information update history storage means 21 with the data None, and, when they do not match each other, the comparing unit sends "1" to the OR gate 62 and otherwise the comparing unit sends "0" to the OR gate 62.

The OR gate 60 implements a logical OR operation on the output of the AND gate 57 and the output of the comparing unit 64, and sends the logical OR operation result to the AND gate 63. The OR gate 61 implements a logical OR operation on the output of the AND gate 58 and the output of the comparing unit 65, and sends the logical OR operation result to the AND gate 63. The OR gate 62 implements a logical OR operation on the output of the AND gate 59 and the output of the comparing unit 66, and sends the logical OR operation result to the AND gate 63. The AND gate 63 implements a logical AND operation on the outputs of the OR gates 60, 61, and 62, and sends the logical AND operation result to the third and fourth operation starting units $19_3$ and $19_4$. The first to fourth operation starting units $19_1$ to $19_4$ are the same as those in accordance with above-mentioned embodiment 2.

Next, the operation of the navigation apparatus in accordance with embodiment 3 of the present invention which is constructed as mentioned above will be explained.

First, in this navigation apparatus, if the map information is not updated at least once, the map information ID storage areas 1 to 3 of the map information update history storage means 21 are set up as follows.

Map information ID storage area 1->None
Map information ID storage area 2->None
Map information ID storage area 3->None In this case, because each of the comparing units 64 to 66 of the operation item selection control means 19 outputs "1", the AND gate 63 outputs "1." Therefore, all of the first to fourth operation starting units $19_1$ to $19_4$ create start signals so as to start the operation-item-1 calculating means $20_1$, operation-item-2 calculating means $20_2$, operation-item-3 calculating means $20_3$, and operation-item-4 calculating means $20_4$ of the navigation information calculating means 20.

Next, assuming that the map information stored in the map information storage means 11 is updated to map information having a map information ID=ID1, the map information ID storage areas 1 to 3 of the map information update history storage means 21 are changed as follows.

Map information ID storage area 1->ID1
Map information ID storage area 2->None
Map information ID storage area 3->None In this case, if the storage medium having the map information ID=ID1 is mounted to any one of the first to third storage medium driving means $12_1$ to $12_3$, all the operation items are carried out, and otherwise only some operation items are carried out.

Hereafter, assuming that the map information is updated in turn to several pieces of map information having a map information ID=ID3->ID4->ID5, the map information ID storage area of the map information update history storage means 21 is changed as follows.

Map information ID storage area 1->ID5
Map information ID storage area 2->ID4
Map information ID storage area 3->ID3

In this case, if each of the storage medium of map information ID=ID5, the storage medium of map information ID=ID4, and the storage medium of map information ID=ID3 is mounted to either of the first to third storage medium driving means $12_1$ to $12_3$, all the operation items are carried out, and otherwise only some operation items are carried out.

Generally, the processing is carried out as follows. Now, the number of times that the map information has been updated in the past is expressed as k, p=max(k, m), and map information IDs corresponding to the p latest updates of the map information are expressed as ID1, ID2, . . . , and IDp. In this case, when the storage medium of map information ID=ID1 is mounted, the storage medium of map information ID=ID2 is mounted, . . . , and the storage medium of map information ID=IDp is mounted, all the operation items are carried out, and otherwise only some operation items are carried out.

Figure 9:
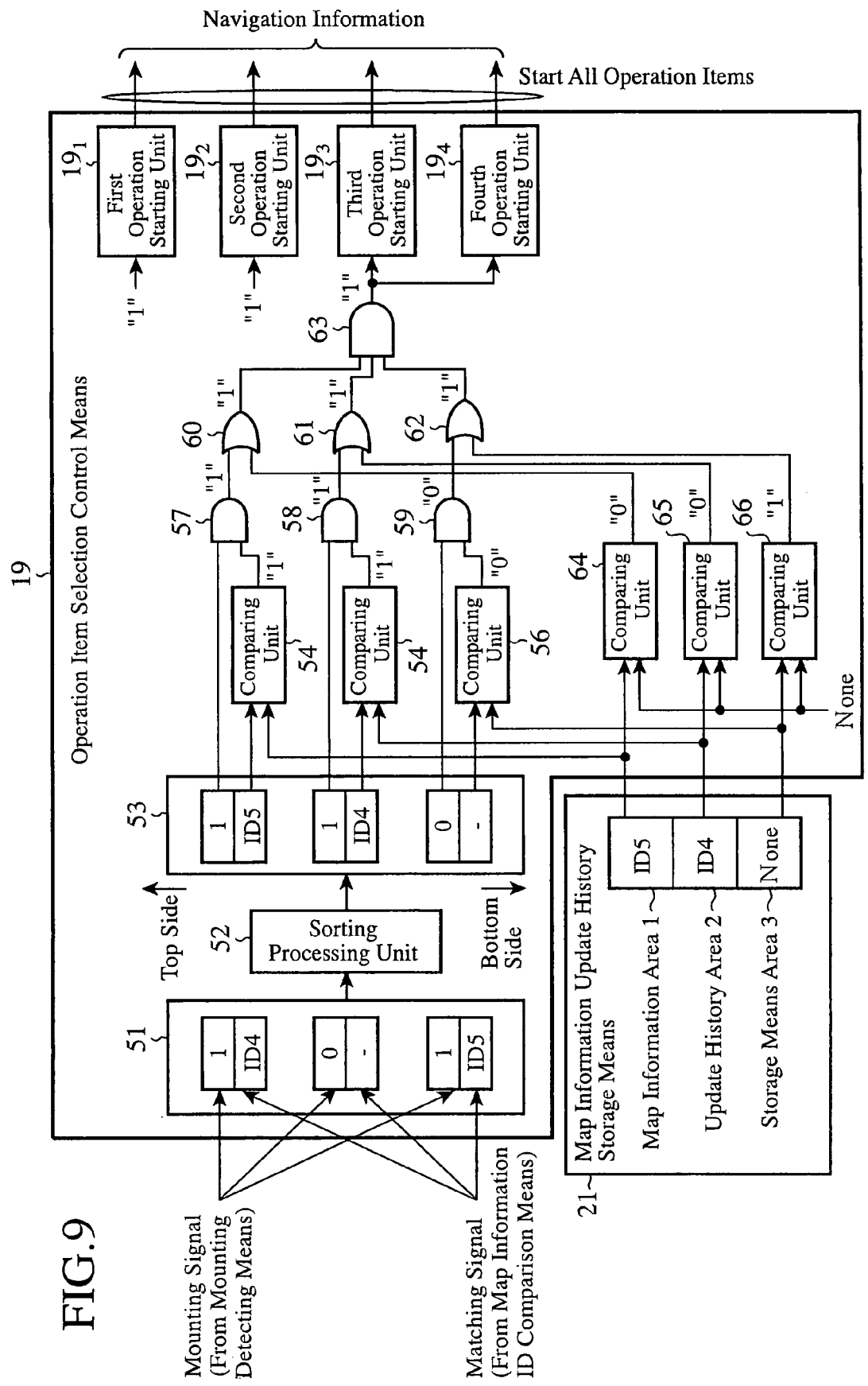
FIG. 9 is a diagram for explaining an operation of the operation item selection control means shown in FIG. 8 in a case in which no operation items are inhibited from being carried out.

FIG. 9 is a diagram showing the state of each unit of the operation item selection control means 19 in an example of the case in which no operation items are inhibited from being carried out. This figure shows the state in which the map information stored in the map information storage means 11 has been updated to pieces of map information in order of increasing map information ID=ID4->ID5, the storage medium in which the map information of ID=ID4 is stored is mounted to the first storage medium driving means 12₁, and the storage medium in which the map information of ID=ID5 is stored is mounted to the third storage medium driving means 12₃. Because in this state the storage media are used legally, all the operation items are carried out.

Figure 10:
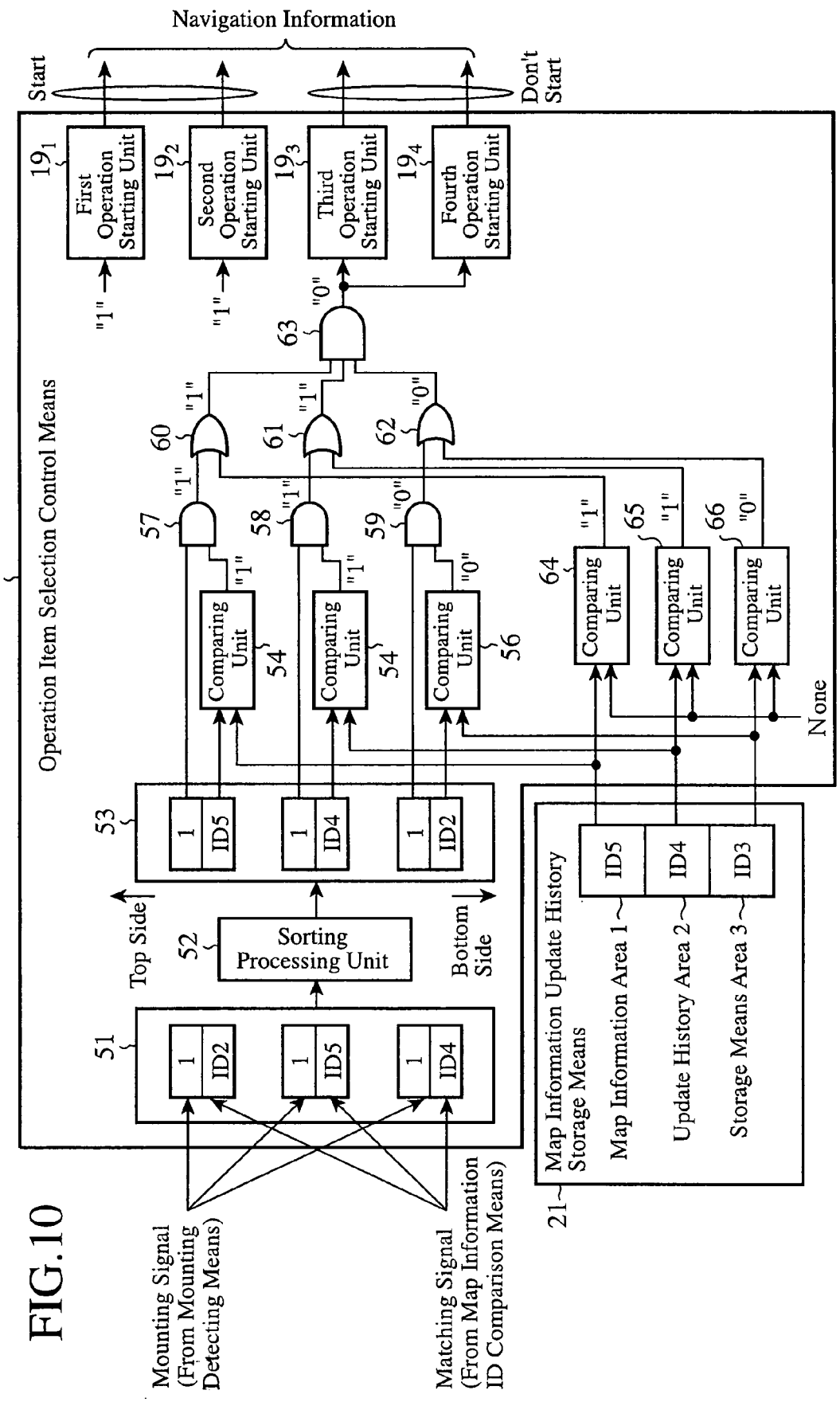
FIG. 10 is a diagram for explaining an operation of the operation item selection control means shown in FIG. 8 in a case in which some operation items are inhibited from being carried out.

FIG. 10 is a diagram showing the state of each unit of the operation item selection control means 19 in an example of the case in which some operation items are inhibited from being carried out. This figure shows the state in which the map information stored in the map information storage means 11 has been updated to pieces of map information in order of increasing map information ID=ID3->ID4->ID5, the storage medium in which the map information of ID=ID2 is stored is mounted to the first storage medium driving means 12₁, the storage medium in which the map information of ID=ID5 is stored is mounted to the second storage medium driving means 12₂, and the storage medium in which the map information of ID=ID4 is stored is mounted to the third storage medium driving means 12₃.

In this case, the storage media of map information IDs=ID5, ID4, and ID3 should be set to the first to third storage medium driving means 12₁ to 12₃, respectively, though in the above-mentioned example, because the storage medium of ID2 is mounted to the first storage medium driving means 12₁, the comparing unit 56 outputs "0" and the comparing unit 66 also outputs "0." Therefore, because the AND gate 63 outputs "0", and the third and fourth operation starting units 19₃ and 19₄ do not output any start signals, only some operation items are carried out.

As explained above, the navigation apparatus in accordance with the embodiment 3 of the present invention provides the following advantages. Now assuming a case in which a prior art navigation apparatus as explained in Background of the Invention is used, map update information may be used illegally as will be mentioned below. That is, assume that a user 1 and a user 2 own prior art navigation apparatus, respectively, and the user 1 performs the following operations in turn (further assume that ID2 shows a newer version than ID1).

(1) The user 1 purchases a storage medium in which map update information of map information ID=ID1 is stored, and then updates the map information stored in the navigation apparatus which he or she owns to the map information of map information ID=ID1.

(2) After that, the user 1 purchases a storage medium in which map update information of map information ID=ID2 is stored, and then updates the map information stored in the navigation apparatus which he or she owns to the map information of map information ID=ID2.

After performing the above-mentioned operation (2), the user 1 needs to mount the storage medium of map information ID=ID2 in the navigation apparatus which he or she owns in order to use the navigation functions of the navigation apparatus with the map information of map information ID=ID2. On the other hand, after performing the above-mentioned operation (2), the user 1 does not need the storage medium of map information ID=ID1 anymore.

At this time, the user 1 can transfer the storage medium of map information ID=ID1 to the user 2. In this case, while the user 2 can update the map information stored in the navigation apparatus which he or she owns to the map information of map information ID=ID1, he or she can mount the storage medium of map information ID=ID1 to the navigation apparatus even after updating the map information. Thereby, the user 2 can use the navigation functions of the navigation apparatus with the map information of map information ID=ID1. However, because the user 2 has not paid the usage fee of the map information of map information ID=ID1, the usage of the map information of map information ID=ID1 by the user 2 is unauthorized usage.

In contrast, according to the navigation apparatus in accordance with embodiment 3 of the present invention, the above-mentioned problem can be solved. That is, after performing the above-mentioned operation (2), while the user 1 needs to mount the storage medium of map information ID=ID2 to the navigation apparatus which he or she owns in order to use the navigation functions of the navigation apparatus with the map information of map information ID=ID2, the user 2 also needs to mount the storage medium of map information ID=ID1 to the navigation apparatus. Therefore, the user 1 cannot transfer the storage medium of map information ID=ID1 to another person. Therefore, the navigation apparatus in accordance with embodiment can prevent any unauthorized usage, as mentioned above, of the map update information.

As mentioned above, the navigation apparatus in accordance with this embodiment 3 is so constructed as to, unless all of p storage media which were used during the p nearest updates of the map information are mounted therein, inhibit some of the operation items for the navigation information from being carried out. The navigation apparatus in accordance with embodiment 1 can also be so constructed as to, unless all of p storage media which were used during the p nearest updates of the map information are mounted therein, limit the description of map information which can be read out, like that in accordance with embodiment 3.

Embodiment 4

Figure 11:
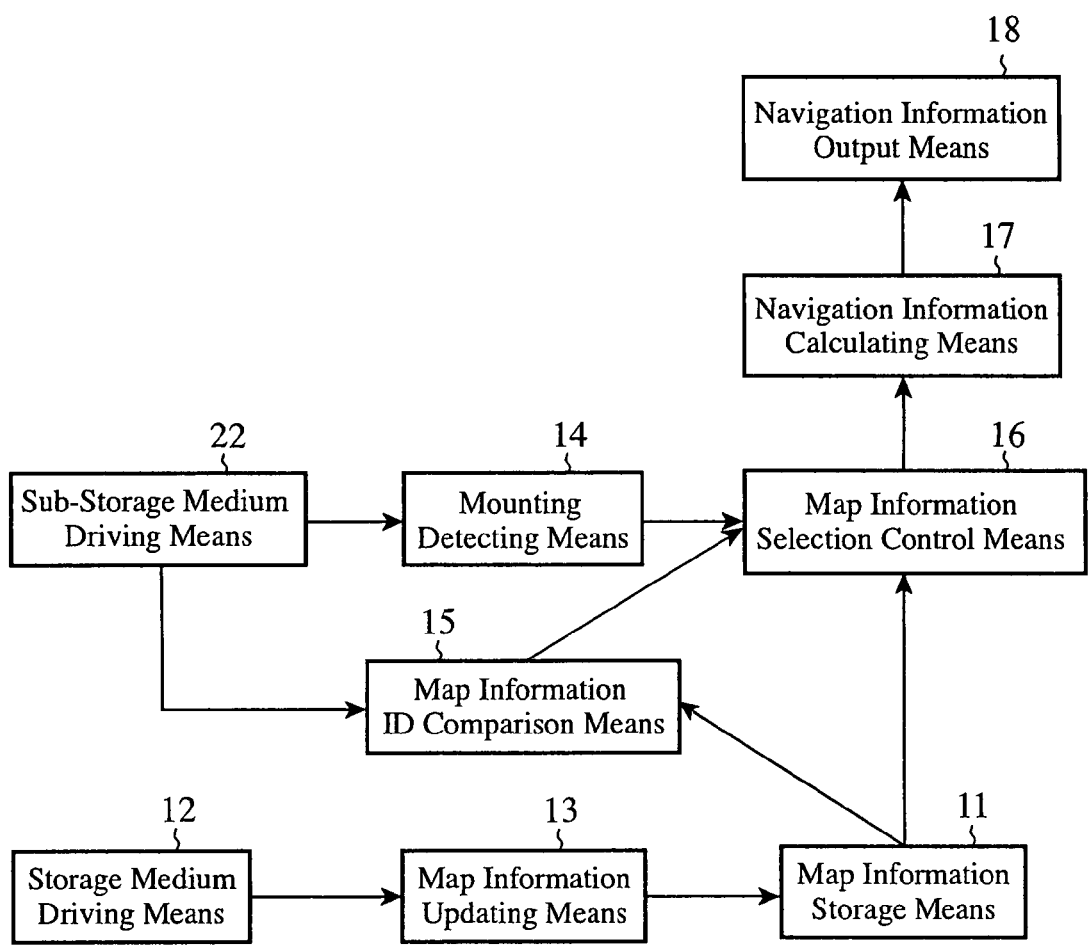
FIG. 11 is a block diagram showing the structure of a navigation apparatus according to embodiment 4 of the present invention.

FIG. 11 is a block diagram showing the structure of a navigation apparatus in accordance with embodiment 4 of the present invention. This navigation apparatus is provided with a map information storage means 11, a storage medium driving means 12, a map information updating means 13, a mounting detecting means 14, a map information ID comparison means 15, a map information selection control means 16, a navigation information calculating means 17, a navigation information output means 18, and a sub-storage medium driving means 22.

The navigation apparatus in accordance with this embodiment 4 differs from that in accordance with embodiment 1 in that the sub-storage medium driving means 22 is added, and the structures and operations of the mounting detecting means 14 and map information ID comparison means 15 differ from those of embodiment 1. Hereinafter, the navigation apparatus of this embodiment will be explained focusing on the components which are different from those of the navigation apparatus in accordance with embodiment 1.

The navigation apparatus in accordance with this embodiment 4 stores map update information in a storage medium mounted to the storage medium driving means 12, and stores a map information ID which corresponds to this map update information in a sub-storage medium mounted to the sub-storage medium driving means 22 which is disposed separately from the storage medium driving means 12. That is, although in the navigation apparatus in accordance with above-mentioned embodiments 1 to 3, the map update information and map information ID are stored in the single storage medium, in the navigation apparatus in accordance with this embodiment 4, they are stored in the media which are physically separate from each other, respectively.

The sub-storage medium driving means 22 consists of a drive for driving the sub-storage medium. A flash memory, which can be the sub-storage medium in which the map information ID is stored, is mounted or dismounted to or from the sub-storage medium driving means 22. The sub-storage medium driving means 22 sends a signal indicating mounting or dismounting of the sub-storage medium thereto or therefrom to the mounting detecting means 14. The sub-storage medium driving means 22 also sends the map information ID stored in the sub-storage medium mounted thereto to the map information ID comparison means 15.

The mounting detecting means 14 detects whether or not the sub-storage medium is mounted to the sub-storage medium driving means 22 on the basis of the signal indicating the mounting or dismounting of the sub-storage medium which is sent from the sub-storage medium driving means 22. The detection result of this mounting detecting means 14 is sent to the map information selection control means 16 as a mounting signal. To be more specific, when the sub-storage medium is mounted to the sub-storage medium driving means 22, the mounting detecting means sends, as the mounting signal, "1" to the map information selection control means 16, and, when no sub-storage medium is mounted to the sub-storage medium driving means 22, sends, as the mounting signal, "0" to the map information selection control means 16.

The map information ID comparison means 15 compares the map information ID stored in the sub-storage medium mounted to the sub-storage medium driving means 22 with the map information ID stored in the map information storage means 11. The comparison result of this map information ID comparison means 15 is then sent to the map information selection control means 16 as a matching signal.

The operation of the navigation apparatus in accordance with embodiment 4 of the present invention which is constructed as mentioned above is the same as that of the navigation apparatus in accordance with embodiment 1, with the exception that the mounting detecting means 14 detects whether or not the sub-storage medium is mounted to the sub-storage medium driving means 22 on the basis of the signal indicating the mounting or dismounting of the sub-storage medium which is sent from the sub-storage medium driving means 22, and the map information ID comparison means 15 compares the map information ID stored in the sub-storage medium mounted to the sub-storage medium driving means 22 with the map information ID stored in the map information storage means 11.

That is, in the navigation apparatus in accordance with this embodiment 4, the storage medium is mounted to the storage medium driving means 12 first, and the map information stored in the map information storage means 11 is updated. After that, the sub-storage medium is mounted to the sub-storage medium driving means 22. When the sub-storage medium is mounted, and the map information ID of the sub-storage medium matches the map information ID stored in the map information storage means 11, the navigation apparatus enables all the navigation functions thereof.

As explained above, the navigation apparatus in accordance with embodiment 4 of the present invention provides the following advantage. That is, typically, the navigation apparatus can have a car audio and DVD mechanism combined in one unit. That is, one mechanism for reading a DVD is disposed in the navigation apparatus, and is also used to play back music or an image at normal times. When the necessity to update the map data stored in the HDD arises, a DVD for update of the map data is inserted into the mechanism so that the map data stored in the HDD is updated using the DVD. After completing this update, the navigation apparatus allows the user to replace the DVD for update of the map data with another DVD so as to play back music or an image again.

In order to apply the technology explained in above-mentioned embodiment 1 to such a navigation apparatus, there is a necessity to dispose a total of two sets of mechanisms of reading DVD. That is, it is necessary to provide one set only for playback of music or an image, and another set only for a reader to which a DVD for update of the map data is mounted. A problem with this structure is that the navigation apparatus becomes complicated and increases in cost.

In contrast, the navigation apparatus in accordance with embodiment 4 provides, as map update information, one set of a storage medium in which the map update information is stored and a sub-storage medium which the map information ID of the map update information is stored for the user, and, when the sub-storage medium is mounted to the navigation apparatus and the map information ID stored in the sub-storage medium matches the map information ID stored in the map information storage means 11, enables the navigation functions thereof. Therefore, the navigation apparatus can usually play back music or an image, and, when the user desires to update the map information, allows he or she to insert a storage medium for update of the map information into the navigation apparatus so as to update the map information stored in the map information storage means 11, so that, after that, the user can use the updated map information at the same time when making the navigation apparatus play back music or an image by mounting the sub-storage medium to the sub-storage medium driving means 22. Therefore, the navigation apparatus of this embodiment does not need to newly provide a DVD reading mechanism.

Embodiment 5

A navigation apparatus in accordance with embodiment 5 of the present invention is so constructed as to support a case in which map update information is stored separately in two or more storage media, with the same structure as that of the navigation apparatus in accordance with embodiment 1. Serial numbers ID-1, ID-2, and . . . are attached to the two or more storage media for use in this navigation apparatus, respectively, and the storage medium ID-1 is the first one of the plurality of storage media.

Figure 12:
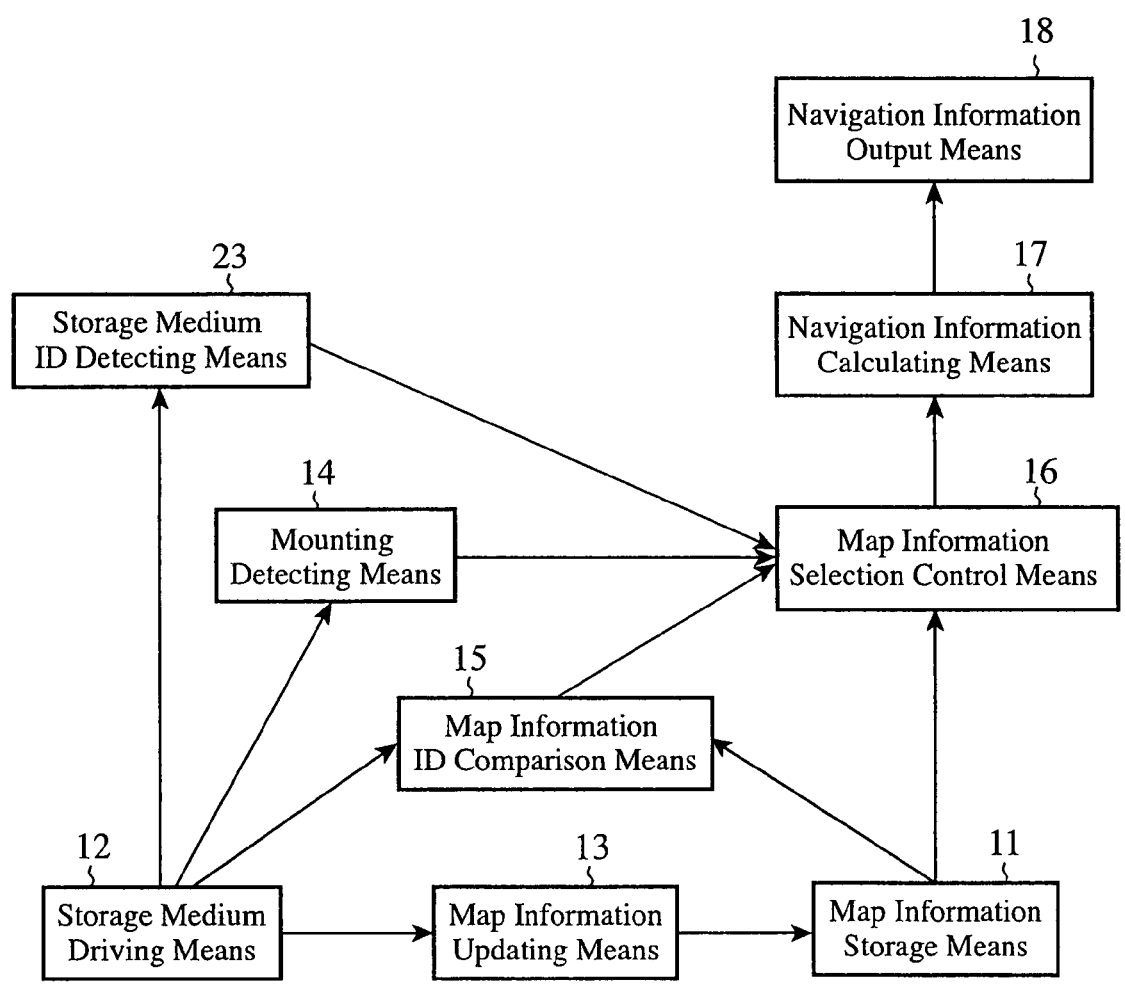
FIG. 12 is a block diagram showing the structure of a navigation apparatus according to embodiment 5 of the present invention.

FIG. 12 is a block diagram showing the structure of the navigation apparatus in accordance with embodiment 5 of the present invention. In this navigation apparatus, a storage medium ID detecting means 23 is added to the components of the navigation apparatus in accordance with embodiment 1. Hereinafter, the navigation apparatus of this embodiment will be explained focusing on the components which are different from those of the navigation apparatus in accordance with embodiment 1.

The storage medium ID detecting means 23 detects whether or not a storage medium mounted to the storage medium driving means 12 is the first one of the plurality of storage media. The detection result of this storage medium ID detecting means 23 is sent to a map information selection control means 16 as a storage medium ID signal. Concretely, when the storage medium mounted to the storage medium driving means 12 is the first one of the plurality of storage media, i.e., when the storage medium mounted to the storage medium driving means 12 is the one to which the storage medium ID number ID-1 is attached, the storage medium ID detecting means sends "1", as the storage medium ID signal, to the map information selection control means 16, and, when the storage medium mounted to the storage medium driving means 12 is the second or subsequent one of the plurality of storage media, the storage medium ID detecting means sends "0", as the storage medium ID signal, to the map information selection control means 16.

The map information selection control means 16 selects map information read from a map information storage means 11 on the basis of the storage medium ID signal from the storage medium ID detecting means 23, a mounting signal from a mounting detecting means 14, and a matching signal from a map information ID comparison means 15, and sends the selected map information to a navigation information calculating means 17. That is, when a storage medium is mounted to the storage medium driving means 12, the map information ID stored in the map information storage means 11 matches the map information ID stored in the storage medium mounted to the storage medium driving means 12, and the storage medium ID signal from the storage medium ID detecting means 23 indicates that the storage medium mounted to the storage medium driving means is the first one of the plurality of storage media, the map information selection control means 16 judges that the storage medium is being used legally, and sends all the map information read from the map information storage means 11 to the navigation information calculating means 17. In contrast, when the above-mentioned conditions are not satisfied, the map information selection control means 16 judges that the storage medium is not being used legally, and sends only a part of the map information read from the map information storage means 11 to the navigation information calculating means 17.

Figure 13:
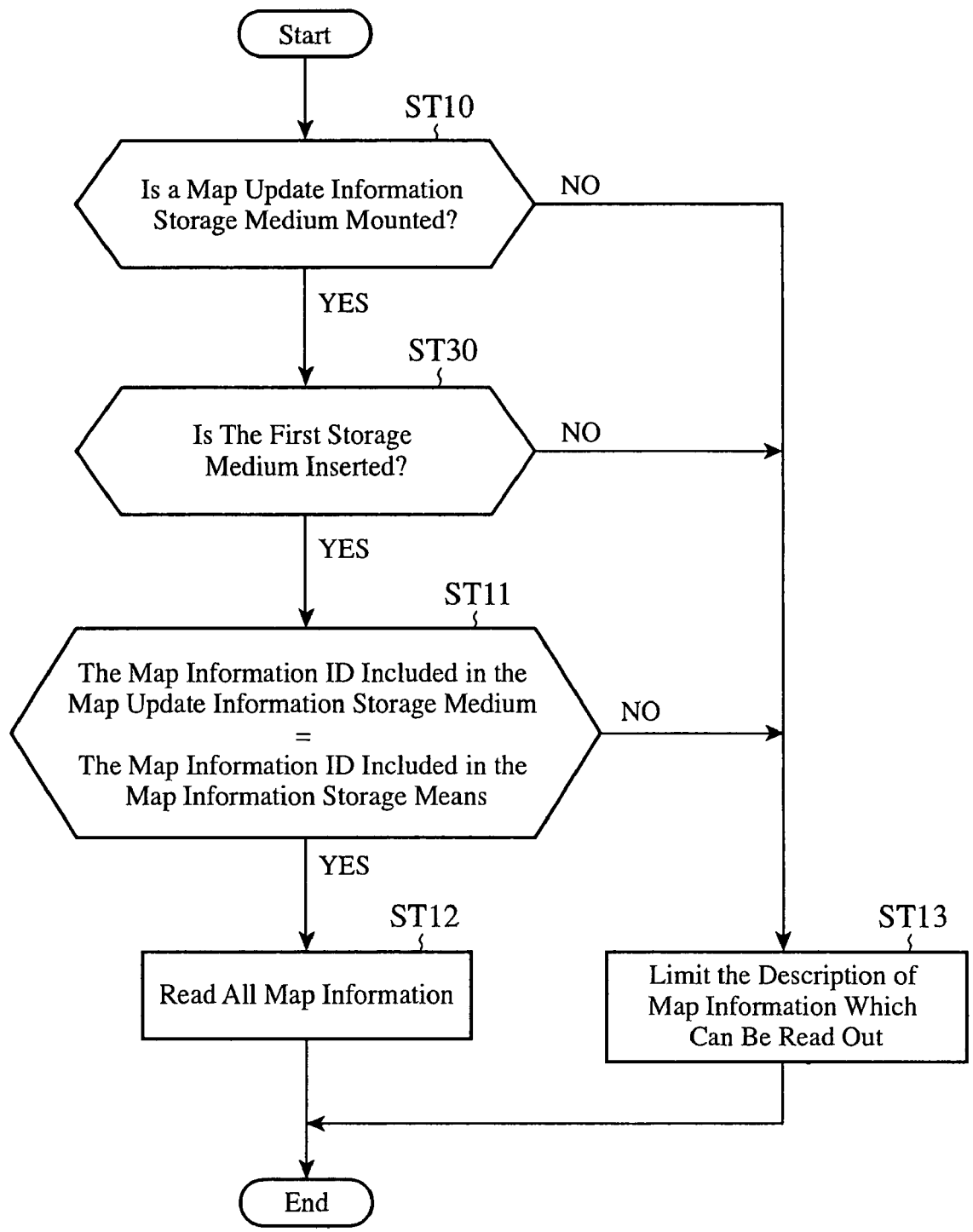
FIG. 13 is a flow chart showing an outline of a process of updating map information by the navigation apparatus in accordance with the embodiment 5 of the present invention.

Next, an outline of the updating process of updating the map information in the navigation apparatus in accordance with embodiment 5 of the present invention which is constructed as mentioned above will be explained with reference to a flow chart shown in FIG. 13. This updating process is carried out by the map information selection control means 16. Steps in which the same processes as those of the flow chart shown in FIG. 3 showing the operation of the navigation apparatus in accordance with embodiment 1 are carried out are designated by the same reference symbols as shown in FIG. 3, and therefore the explanation of the steps will be simplified hereafter.

When updating the map information, this navigation apparatus checks to see whether or not a storage medium in which map update information is stored is mounted to the storage medium driving means 12 first (in step ST10). When, in this step ST10, determining that a storage medium in which map update information is stored is mounted to the storage medium driving means, the map information selection control means checks to see whether or not the first storage medium is inserted into the storage medium driving means (in step ST30). That is, the map information selection control means 16 checks to see whether the storage medium ID signal sent from the storage medium ID detecting means 23 indicates "1." When, in this step ST10, determining that the first storage medium is mounted to the storage medium driving means, the map information selection control means checks to see whether the map information ID included in the storage medium in which the map update information is stored matches the map information ID included in the map information storage means 11 (in step ST11).

When, in step ST11, determining that the map information ID included in the storage medium matches the map information ID included in the map information storage means, the map information selection control means reads all the map information (in step ST12). When, in above-mentioned step ST10, determining that no storage medium is mounted to the storage medium driving means, or when, in step ST11, determining that the map information ID included in the storage medium does not match the map information ID included in the map information storage means, the map information selection control means limits the description of map information which can be read out (in step ST13).

As previously explained, in a case in which the map update information has a large volume and is separately stored in two or more storage media, the navigation apparatus in accordance with embodiment 5 of the present invention enables all the functions thereof without limiting the description of map information which can be read out only when the first one of the two or more storage media is mounted to the storage medium driving means 12. Therefore, the present embodiment offers the same advantages as above-mentioned embodiment 1.

In the navigation apparatus in accordance with this embodiment 5, the storage medium ID detecting means 23 is added to the components of the navigation apparatus in accordance with embodiment 1, as previously explained. As an alternative, the storage medium ID detecting means 23 can be added to the components of the navigation apparatus in accordance with embodiment 2. In this variant, only when the first one of the two or more storage media is mounted to the storage medium driving means 12, the navigation apparatus enables all the functions thereof without inhibiting some operation items from being carried out. Therefore, this variant offers the same advantages as above-mentioned embodiment 1.

Furthermore, in the case in which the map update information is stored separately in the two or more storage media, the navigation apparatus can be so constructed as to enable all the functions thereof when an arbitrary one of the two or more storage media is mounted to the storage medium driving means 12. Hereafter, assume a case in which the map update information is stored separately in two DVDs. If the navigation apparatus is so constructed as to enable all the functions thereof only when the first one of the two DVDs is mounted to the storage medium driving means 12, the navigation apparatus does not function even if the second DVD is inserted into the storage medium driving means. Therefore, after updating the map information using the second DVD, the user must perform an operation of inserting the first DVD into the storage medium driving means. This operation is troublesome for the user, and may also cause the user to make a mistake. This problem can be solved by enabling all the functions of the navigation apparatus when an arbitrary one of the two DVDs is mounted to the storage medium driving means 12.

Embodiment 6

A navigation apparatus in accordance with embodiment 5 of the present invention is so constructed as to support a case in which map update information is stored separately in two or more storage media according to two or more specific areas, with the same structure as that of the navigation apparatus in accordance with embodiment 1. Pieces of information each showing a map to which a corresponding piece of map update information is applied are stored in the two or more storage media for use in this navigation apparatus, respectively.

Figure 14:
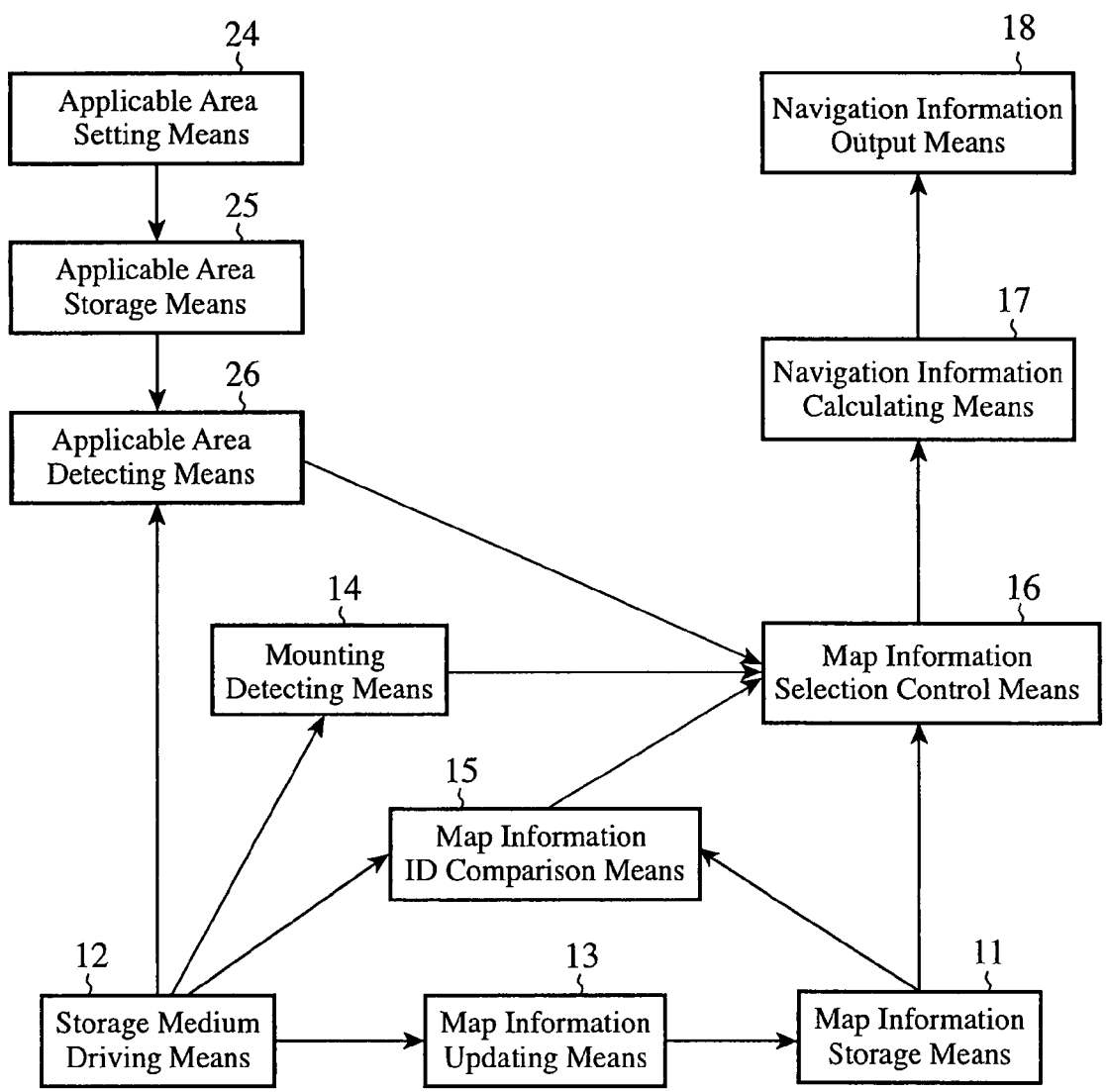
FIG. 14 is a block diagram showing the structure of a navigation apparatus according to embodiment 6 of the present invention.

FIG. 14 is a block diagram showing the structure of the navigation apparatus in accordance with embodiment 6 of the present invention. In this navigation apparatus, an applicable area setting means 24, an applicable area storage means 25, and an applicable area detecting means 26 are added to the components of the navigation apparatus in accordance with embodiment 1. Hereinafter, the navigation apparatus of this embodiment will be explained focusing on the components which are different from those of the navigation apparatus in accordance with embodiment 1.

The applicable area setting means 24 sets up an applicable area which the user uses for this navigation apparatus according to an instruction from outside the navigation apparatus. The applicable area set up by this applicable area setting means 24 is sent to the applicable area storage means 25. The applicable area storage means 25 stores the applicable area sent from the applicable area setting means 24 therein. The applicable area stored in this applicable area storage means 25 is read by the applicable area detecting means 26.

The applicable area detecting means 26 judges whether an applicable area stored in a storage medium mounted to a storage medium driving means 12 matches the applicable area stored in the applicable area storage means 25, and, when they match each other, sends "1", as an applicable area matching signal, to a map information selection control means 16, and otherwise the applicable area detecting means sends "0", as the applicable area matching signal, to the map information selection control means 16.

Figure 15:
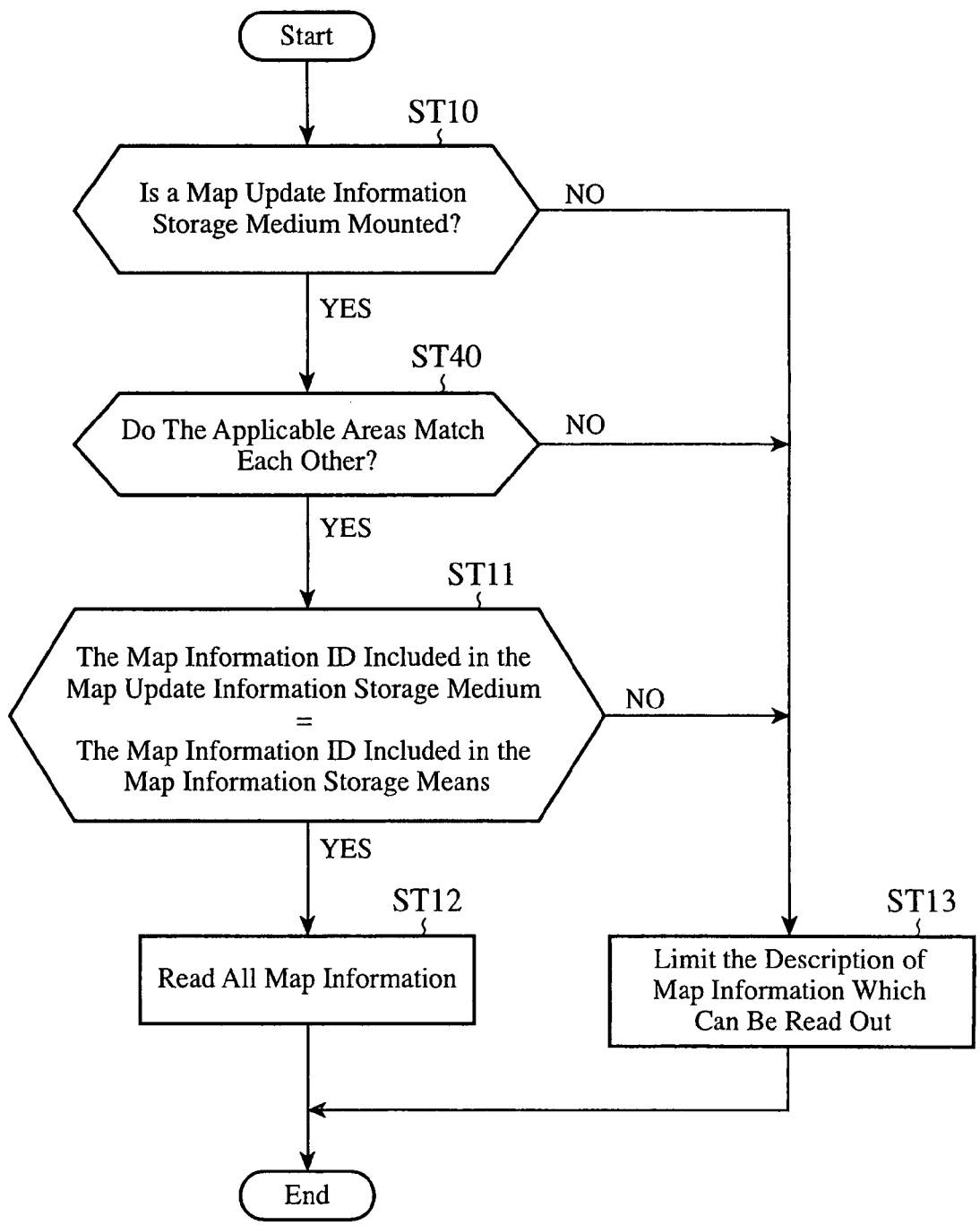
FIG. 15 is a flow chart showing an outline of a process of updating map information by the navigation apparatus in accordance with the embodiment 6 of the present invention.

Next, an outline of an updating process of updating the map information in the navigation apparatus in accordance with embodiment 6 of the present invention which is constructed as mentioned above will be explained with reference to a flow chart shown in FIG. 15. This updating process is carried out by the map information selection control means 16. Steps in which the same processes as those of the flowchart shown in FIG. 3 showing the operation of the navigation apparatus in accordance with embodiment 1 are carried out are designated by the same reference symbols as shown in FIG. 3, and therefore the explanation of the steps will be simplified hereafter.

When updating the map information, this navigation apparatus checks to see whether or not a storage medium in which map update information is stored is mounted to the storage medium driving means 12 first (in step ST10). When, in this step ST10, determining that a storage medium in which the map update information is stored is mounted to the storage medium driving means, the map information selection control means checks to see whether or not the applicable area stored in the storage medium matches the applicable area stored in the applicable area storage means (in step ST40). That is, the applicable area detecting means 26 checks to see whether the applicable area shown by the storage medium mounted to the storage medium driving means 12 matches the applicable area stored in the applicable area storage means 25. That is, the applicable area detecting means checks to see whether the applicable area matching signal indicates "1." When, in this step ST10, determines that the applicable area shown by the storage medium mounted matches the applicable area stored in the applicable area storage means, the applicable area detecting means checks to see whether a map information ID included in the storage medium of the map update information matches map information ID included in a map information storage means 11 (in step ST11).

When, in step ST11, determining that the map information ID included in the storage medium matches the map information ID included in the map information storage means, the map information selection control means reads all the map information (in step ST12). When, in above-mentioned step ST10, determining that no storage medium is mounted to the storage medium driving means, or when, in step ST11, determining that the map information ID included in the storage medium does not match the map information ID included in the map information storage means, the map information selection control means limits the description of map information which can be read out (in step ST13).

As explained above, the navigation apparatus in accordance with embodiment 6 of the present invention provides the following advantage. That is, in a case in which pieces of map update information about specific areas are stored in two DVDs (storage media), respectively, for example, in a case in which map update information about A country is stored in the first DVD, and map update information about B country is stored in the second DVD, if the user is a resident of B country, he or she can simply use only the second DVD so as to update the map information stored in the map information storage means 11 without having to use the first DVD, in order to attain his or her purpose for using the navigation apparatus. In order to support this case, the navigation apparatus can be alternatively constructed as to enable all the functions thereof only when a DVD corresponding to an area to which update map information is applied is mounted to the storage medium driving means.

In this navigation apparatus in accordance with embodiment 6, the applicable area setting means 24, applicable area storage means 25, and applicable area detecting means 26 are added to the components of the navigation apparatus in accordance with embodiment 1, as previously explained. As an alternative, the applicable area setting means 24, applicable area storage means 25, and applicable area detecting means 26 can be added to the components of the navigation apparatus in accordance with embodiment 2. In this variant, only when the applicable area shown by the storage medium mounted to the storage medium driving means matches the applicable area stored in the applicable area storage means, the navigation apparatus enables all the functions thereof without inhibiting some operation items from being carried out. Therefore, this variant offers the same advantages as above-mentioned embodiment 2.

Next, a variant of the navigation apparatus in accordance with above-mentioned embodiments 1 and 2 will be explained. The structure of enabling all the functions of the navigation apparatus when an arbitrary one of the above-mentioned two DVDs is mounted to the storage medium driving means 12 has the following problem. For example, assume a case in which two persons purchase one set of two DVDs, and the two users update map data stored in the HDDs of their respective navigation apparatus. Furthermore, assume that after that, one of them places his or her navigation apparatus in a state in which the first one of the two DVDs is mounted, and the other one of them places his or her navigation apparatus in a state in which the second one of the two DVDs is mounted. In this case, both the two persons can update the map data stored in the HDDs of their respective navigation apparatus, and can use all the functions of their respective navigation apparatus effectively. However, because in this case only one set of two DVDs is purchased by them as a whole, this case is an illegal use.

This problem can be solved with the following structure. First, immediately after the map data stored in the HDD of each of their navigation apparatus is updated, all the functions of the navigation apparatus are controlled so that they are disabled unless the first one of the two DVDs is being mounted. After that, after one week elapses, all the functions of the navigation apparatus are controlled so that they are disabled unless the first DVD is replaced by the second DVD and the second DVD is being mounted. After that, after one week further elapses, all the functions of the navigation apparatus are controlled so that they are disabled unless the second DVD is replaced by the first DVD and the first DVD is being mounted. After that, each user is required to interchange the first and second DVDs every week (in general, at fixed time intervals). In a case in which a set of N DVDs for update of the map data is provided, each user is required to select a DVD cyclically out of the N DVDs and replace the DVD currently being mounted with the selected DVD at fixed time intervals.

In the case in which the navigation apparatus is constructed as mentioned above, because each user is required to interchange the first and second DVDs at fixed time intervals, the two users need to expend complicated efforts in inserting the two DVDs into their respective navigation apparatus simultaneously. Therefore, the present embodiment can prevent a state in which two users insert the two DVDs in their respective navigation apparatus simultaneously from occurring.

INDUSTRIAL APPLICABILITY

As mentioned above, the navigation apparatus in accordance with the present invention is suitable for applications in which various kinds of guidance are provided for the user using map information because the navigation apparatus makes it possible for the user to recognize that the suppression of the information to be provided for the user results from an illegal use of the map data, and is excellent at user-friendliness.

The invention claimed is:

1. A navigation apparatus comprising:
a map information storage unit that stores map information;
a storage medium driving unit in which a storage medium for storing map update information used for updating said map information is mounted;
a map information updating unit that updates the map information stored in said map information storage unit on a basis of the map update information read from the storage medium mounted to said storage medium driving unit;
a mounting detecting unit that detects whether or not the storage medium is mounted to said storage medium driving unit;
a map information ID comparison unit that compares a map information ID attached to the map information stored in said map information storage unit with a map information ID attached to the map update information stored in the storage medium mounted to said storage medium driving unit, and judging whether said compared map information IDs match each other;
a map information selection control unit that selects a part of the map information stored in said map information storage unit under conditions where the mounting detecting unit detects the storage medium being mounted to the mounting detecting unit and the map information ID comparison unit judges that said compared map information IDs do not match each other;
a navigation information calculating unit that creates navigation information by carrying out an predetermined operation on a basis of the map information selected by said map information selection control unit; and
a navigation information output unit that outputs the navigation information created by said navigation information calculating unit.

2. The navigation apparatus according to claim 1, further comprising a map information update history storage unit that stores a map information ID attached to the map information updated by the map information updating unit,
wherein the map information selection control unit selects a part of the map information stored in said map information storage unit when a storage medium having the same map information ID as a map information ID stored in the map information update history storage unit is not mounted to the storage medium driving unit.

3. The navigation apparatus according to claim 1, further comprising a storage medium ID detecting unit that detects whether a storage medium mounted to said storage medium driving unit is a first one of two or more storage media when map update information has been separately stored in said two or more storage media,
wherein the map information selection control unit selects a part of the map information stored in said map information storage unit when the storage medium ID detecting unit detects that said storage medium mounted to said storage medium driving unit is not the first one.

4. The navigation apparatus according to claim 1, further comprising a storage medium ID detecting unit that detects, when map update information has been separately stored in said two or more storage media, whether a storage medium mounted to said storage medium driving unit is either one of said two or more storage media,
wherein the map information selection control unit selects a part of the map information stored in said map information storage unit when the storage medium ID detecting unit detects that said storage medium mounted to said storage medium driving unit is not either one of said two or more storage media.

5. The navigation apparatus according to claim 1, further comprising:
an applicable area setting unit that sets areas to be applied to map update information when said map update information has been separately stored in two or more storage media according to said areas; and
a storage medium ID detecting unit that detects whether the area set by said application area setting unit matches an applicable area stored in a storage medium mounted to said storage medium driving unit,
wherein the map information selection control unit selects a part of the map information stored in said map information storage unit when the storage medium ID detecting unit detects that the area set by said application area setting unit does not match the applicable area.

6. The navigation apparatus according to claim 1, further comprising a sub-storage medium driving unit for mounting a sub-storage medium in which the map information ID attached to the map update information is stored,
wherein the mounting detecting unit detects the sub-storage medium being mounted to said sub-storage medium driving unit, and
the map information ID comparison unit compares the map information ID attached to the map information stored in the map information storage unit with the map information ID stored in the sub-storage medium mounted to said sub-storage medium driving unit, and judges whether said compared map information IDs match each other.

7. A navigation apparatus comprising:
a map information storage unit that stores map information;
a storage medium driving unit in which a storage medium that stores map update information used that updates said map information is mounted;

a map information updating unit that updates the map information stored in said map information storage unit on a basis of the map update information read from the storage medium mounted to said storage medium driving unit;

a mounting detecting unit that detects whether the storage medium is mounted to said storage medium driving unit;

a map information ID comparison unit that compares a map information ID attached to the map information stored in said map information storage unit with a map information ID attached to the map update information stored in the storage medium mounted to said storage medium driving unit, and judging whether said compared map information IDs match each other;

an operation item selection control unit that selects a part of all operations items for implementing a part of all functions provided in the navigation apparatus under conditions where the mounting detecting unit detects the storage medium being mounted to the storage medium driving unit and the map information ID comparison unit judges that said compared map information IDs do not match each other;

a navigation information calculating unit that creates navigation information by carrying out operation items selected by said operation item selection control unit; and a navigation information output unit for outputting the navigation information created by said navigation information calculating unit.

8. The navigation apparatus according to claim 7, further comprising a map information update history storage unit that stores a map information ID attached to the map information updated by the map information updating unit, wherein the operation item selection control unit selecting a part of all operations items for implementing a part of all functions provided in the navigation apparatus when a storage medium having the same map information ID as a map information ID stored in the map information update history storage unit is not mounted to the storage medium driving unit.

9. The navigation apparatus according to claim 7, further comprising a storage medium ID detecting unit that detects whether a storage medium mounted to said storage medium driving unit is a first one of two or more storage media when map update information has been separately stored in said two or more storage media, wherein the operation item selection control unit selects a part of all operations items for implementing a part of all functions provided in the navigation apparatus when the storage medium ID detecting unit detects that said storage medium mounted to said storage medium driving unit is not the first one.

10. The navigation apparatus according to claim 7, further comprising a storage medium ID detecting unit that detects whether a storage medium mounted to said storage medium driving unit is either one of two or more storage media when map update information has been separately stored in said two or more storage media, wherein the operation item selection control unit selects a part of all operations items for implementing a part of all functions provided in the navigation apparatus when the storage medium ID detecting unit detects that said storage medium mounted to said storage medium driving unit is not either one of said two or more storage media.

11. The navigation apparatus according to claim 7, further comprising:

an applicable area setting unit that sets areas to be applied to map update information when said map update information has been separately stored in two or more storage media according to said areas; and a storage medium ID detecting unit that detects whether the area set by said application area setting unit matches an applicable area stored in a storage medium mounted to said storage medium driving unit, wherein the operation item selection control unit selects a part of all operations items for implementing a part of all functions provided in the navigation apparatus when the storage medium ID detecting unit detects that the area set by said application area setting unit does not match the applicable area.

* * * * *